US009392024B2

(12) United States Patent
Bezilla et al.

(10) Patent No.: US 9,392,024 B2
(45) Date of Patent: *Jul. 12, 2016

(54) POLICY-BASED SELECTION OF REMEDIATION

(71) Applicant: Fortinet, Inc., Sunnyvale, CA (US)

(72) Inventors: Daniel B. Bezilla, Philipsburg, PA (US); John L. Immordino, Sterling, VA (US); James Le Ogura, Oak Hill, PA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,397

(22) Filed: Aug. 18, 2015

(65) Prior Publication Data
US 2015/0358360 A1 Dec. 10, 2015

Related U.S. Application Data

(63) Continuation of application No. 14/622,753, filed on Feb. 13, 2015, now Pat. No. 9,154,523, which is a continuation of application No. 14/153,017, filed on Jan. 11, 2014, now Pat. No. 8,984,586, which is a (Continued)

(51) Int. Cl.
| | |
|---|---|
| *H04L 29/06* | (2006.01) |
| *G06F 9/44* | (2006.01) |
| *G06F 11/00* | (2006.01) |
| *G06F 21/55* | (2013.01) |
| *G06F 21/57* | (2013.01) |

(52) U.S. Cl.
CPC ............. *H04L 63/20* (2013.01); *G06F 21/552* (2013.01); *G06F 21/57* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 5,850,446 | A | 12/1998 | Berger et al. |
| 6,088,804 | A | 7/2000 | Hill et al. |
| 6,205,552 | B1 | 3/2001 | Fudge |

(Continued)

FOREIGN PATENT DOCUMENTS

WO          01/90892          5/2001

OTHER PUBLICATIONS

Notice of Allowance for U.S. Appl. No. 14/622,753 mailed Aug. 26, 2015.

(Continued)

*Primary Examiner* — Christopher Revak
(74) *Attorney, Agent, or Firm* — Hamilton, DeSanctis & Cha LLP

(57) ABSTRACT

Methods and systems for remediating a security policy violation on a computer system are provided. According to one embodiment, information regarding a program-code-based operational state of a host asset is collected by a light weight sensor (LWS) running on the host asset via a survey tool. The information is transmitted by the LWS to a remote server via an external network. Multiple security policies are enforced by the remote server with respect to the host asset based on the received information including determining whether the program-code-based operational state of the host asset represents a violation of one or more security policies, by evaluating, the received information with respect to the security policies, each of which define at least one parameter condition violation of which is potentially indicative of unauthorized activity on the host asset or manipulation of the host asset making the host asset vulnerable to attack.

20 Claims, 11 Drawing Sheets

Related U.S. Application Data continuation of application No. 14/016,091, filed on Aug. 31, 2013, now Pat. No. 8,776,170, which is a continuation of application No. 13/715,017, filed on Dec. 14, 2012, now Pat. No. 8,561,134, which is a continuation of application No. 12/640,908, filed on Dec. 17, 2009, now Pat. No. 8,341,691, which is a continuation of application No. 10/933,504, filed on Sep. 3, 2004, now Pat. No. 7,665,119.

(56) References Cited

U.S. PATENT DOCUMENTS

| | | |
|---|---|---|
| 6,282,546 B1 | 8/2001 | Gleichauf et al. |
| 6,301,668 B1 | 10/2001 | Gleichauf et al. |
| 6,385,317 B1 | 5/2002 | Rix et al. |
| 6,389,538 B1 | 5/2002 | Gruse et al. |
| 6,398,245 B1 | 6/2002 | Gruse et al. |
| 6,513,122 B1 | 1/2003 | Magdych et al. |
| 6,546,493 B1 | 4/2003 | Magdych et al. |
| 6,647,400 B1 | 11/2003 | Moran |
| 6,662,192 B1 | 12/2003 | Rebane |
| 6,711,127 B1 | 3/2004 | Gorman et al. |
| 6,766,458 B1 | 7/2004 | Harris et al. |
| 6,826,697 B1 | 11/2004 | Moran |
| 6,907,531 B1 | 6/2005 | Dodd et al. |
| 6,912,521 B2 | 6/2005 | Kraft et al. |
| 6,922,686 B2 | 7/2005 | Okamoto et al. |
| 6,925,443 B1 | 8/2005 | Baggett, Jr. et al. |
| 6,988,208 B2 | 1/2006 | Hrabik et al. |
| 6,996,843 B1 | 2/2006 | Moran |
| 7,000,247 B2 | 2/2006 | Banzhof |
| 7,013,395 B1 | 3/2006 | Swiler et al. |
| 7,031,945 B1 | 4/2006 | Donner |
| 7,032,114 B1 | 4/2006 | Moran |
| 7,065,657 B1 | 6/2006 | Moran |
| 7,143,442 B2 | 11/2006 | Scarfe et al. |
| 7,197,508 B1 | 3/2007 | Brown |
| 7,278,163 B2 | 10/2007 | Banzhof et al. |
| 7,308,712 B2 | 12/2007 | Banzhof |
| 7,370,032 B2 | 5/2008 | Lehnert |
| 7,376,834 B2 | 5/2008 | Edwards et al. |
| 7,415,025 B1 | 8/2008 | Venkataraman et al. |
| 7,424,706 B2 | 9/2008 | Ivanov et al. |
| 7,451,488 B2 | 11/2008 | Cooper et al. |
| 7,665,119 B2 | 2/2010 | Bezilla et al. |
| 7,672,948 B2 | 3/2010 | Durham |
| 7,694,337 B2 | 4/2010 | D'Mello et al. |
| 7,703,137 B2 | 4/2010 | Durham |
| 7,761,920 B2 | 7/2010 | Bezilla et al. |
| 7,774,848 B2 | 8/2010 | D'Mello et al. |
| 8,001,600 B2 | 8/2011 | Bedzilla et al. |
| 8,127,412 B2 | 3/2012 | Gleichauf et al. |
| 8,132,260 B1 | 3/2012 | Mayer et al. |
| 8,136,163 B2 | 3/2012 | Birt et al. |
| 8,171,555 B2 | 5/2012 | D'Mello et al. |
| 8,230,497 B2 | 7/2012 | Norman et al. |
| 8,250,654 B1 | 8/2012 | Kennedy et al. |
| 8,341,691 B2 | 12/2012 | Bezilla et al. |
| 8,561,134 B2 | 10/2013 | Bezilla et al. |
| 8,776,170 B2 | 7/2014 | Bezilla et al. |
| 8,914,846 B2 | 12/2014 | Bezilla et al. |
| 8,984,586 B2 | 3/2015 | Bezilla et al. |
| 9,154,523 B2 | 10/2015 | Bezilla et al. |
| 2001/0034847 A1 | 10/2001 | Gaul |
| 2002/0026591 A1 | 2/2002 | Hartley et al. |
| 2002/0034302 A1 | 3/2002 | Moriai et al. |
| 2002/0052877 A1 | 5/2002 | Okamoto et al. |
| 2002/0066035 A1 | 5/2002 | Dapp |
| 2002/0087882 A1 | 7/2002 | Schneier et al. |
| 2002/0104014 A1 | 8/2002 | Zobel |
| 2002/0116630 A1 | 8/2002 | Stehlin |
| 2002/0147803 A1 | 10/2002 | Dodd |
| 2002/0188861 A1 | 12/2002 | Townsend |
| 2003/0009694 A1 | 1/2003 | Wenocur et al. |
| 2003/0037142 A1 | 2/2003 | Munger et al. |
| 2003/0065945 A1 | 4/2003 | Lingafelt et al. |
| 2003/0084320 A1 | 5/2003 | Tarquini et al. |
| 2003/0093669 A1 | 5/2003 | Morais et al. |
| 2003/0115147 A1 | 6/2003 | Feldman et al. |
| 2003/0115483 A1 | 6/2003 | Liang |
| 2003/0126010 A1 | 7/2003 | Barns-Slavin |
| 2003/0126472 A1 | 7/2003 | Banzhof |
| 2003/0130983 A1 | 7/2003 | Rebane |
| 2003/0131256 A1 | 7/2003 | Ackroyd |
| 2003/0135749 A1 | 7/2003 | Gales et al. |
| 2003/0140250 A1 | 7/2003 | Taninaka et al. |
| 2003/0154401 A1 | 8/2003 | Hartman et al. |
| 2003/0159060 A1 | 8/2003 | Gales et al. |
| 2003/0163697 A1 | 8/2003 | Pabla et al. |
| 2003/0177121 A1 | 9/2003 | Moona et al. |
| 2003/0204495 A1 | 10/2003 | Lehnert |
| 2003/0204498 A1 | 10/2003 | Lehnert |
| 2004/0025043 A1 | 2/2004 | Gallagher et al. |
| 2004/0064722 A1 | 4/2004 | Neelay et al. |
| 2004/0088565 A1 | 5/2004 | Norman et al. |
| 2004/0088581 A1 | 5/2004 | Brawn et al. |
| 2004/0103192 A1 | 5/2004 | Yli-Korhonen et al. |
| 2004/0111613 A1 | 6/2004 | Shen-Orr et al. |
| 2004/0122964 A1 | 6/2004 | Teh |
| 2004/0143749 A1 | 7/2004 | Tajalli et al. |
| 2004/0221176 A1 | 11/2004 | Cole |
| 2004/0249712 A1 | 12/2004 | Brown et al. |
| 2005/0005159 A1 | 1/2005 | Oliphant |
| 2005/0005162 A1 | 1/2005 | Oliphant |
| 2005/0010819 A1 | 1/2005 | Williams et al. |
| 2005/0010821 A1 | 1/2005 | Cooper et al. |
| 2005/0015595 A1 | 1/2005 | Edwards et al. |
| 2005/0022021 A1 | 1/2005 | Bardsley et al. |
| 2005/0028005 A1 | 2/2005 | Carson et al. |
| 2005/0160480 A1 | 7/2005 | Birt et al. |
| 2005/0229256 A2 | 10/2005 | Banzhof |
| 2006/0004800 A1 | 1/2006 | Okamoto et al. |
| 2006/0018478 A1 | 1/2006 | Diefenderfer et al. |
| 2006/0018485 A1 | 1/2006 | Diefenderfer et al. |
| 2006/0021051 A1 | 1/2006 | D'Mello et al. |
| 2006/0021052 A1 | 1/2006 | D'Mello et al. |
| 2006/0021053 A1 | 1/2006 | D'Mello et al. |
| 2006/0053134 A1 | 3/2006 | Durham |
| 2006/0053265 A1 | 3/2006 | Durham |
| 2006/0053475 A1 | 3/2006 | Bezilla et al. |
| 2006/0053476 A1 | 3/2006 | Bezilla et al. |
| 2006/0080738 A1 | 4/2006 | Bezilla |
| 2006/0095792 A1 | 5/2006 | Hurtado et al. |
| 2006/0129670 A1 | 6/2006 | Mayer |
| 2006/0259779 A2 | 11/2006 | Oliphant |
| 2006/0259972 A2 | 11/2006 | Oliphant |
| 2007/0192867 A1 | 8/2007 | Miliefsky |
| 2007/0256132 A2 | 11/2007 | Oliphant |
| 2007/0271617 A1 | 11/2007 | Mitomo et al. |
| 2009/0119777 A1 | 5/2009 | Jeon |
| 2009/0199298 A1 | 8/2009 | Miliefsky |
| 2010/0138897 A1 | 6/2010 | Bezilla et al. |
| 2010/0153490 A1 | 6/2010 | Durham |
| 2010/0257585 A1 | 10/2010 | Bezilla et al. |
| 2012/0304300 A1 | 11/2012 | LaBumbard |
| 2013/0014264 A1 | 1/2013 | Kennedy et al. |
| 2013/0198800 A1 | 8/2013 | Bezilla et al. |
| 2014/0013385 A1 | 1/2014 | Bezilla et al. |
| 2014/0130120 A1 | 5/2014 | Bezilla et al. |
| 2014/0304767 A1 | 10/2014 | Bezilla et al. |
| 2015/0163249 A1 | 6/2015 | Bezilla et al. |

OTHER PUBLICATIONS

Non-Final Rejection for U.S. Appl. No. 14/622,753 mailed Aug. 13, 2015.

"CERT/CC Advisories", (1988-Nov. 2002), http://web.archive.org/web/20021204080345http://www.cert.org/advisories/, 48 pgs.

"CERT/CC Advisories", (Nov. 2002-2004), http://www.cert.org/advisories/, 7 pgs.

U.S. Appl. No. 10/897,402, Notice of Allowance mailed Jan. 14, 2010, 7 pgs.

(56) References Cited

OTHER PUBLICATIONS

U.S. Appl. No. 10/944,406, Notice of Allowance mailed Nov. 17, 2009, 13 pgs.
U.S. Appl. No. 12/765,431, Non Final Office Action mailed Sep. 15, 2011, 10 pgs.
Security Profiling Inc., White Paper—Version 4.2, "Sys Update. TM.—Patch Management with the Policy Compliance & Enforcement (PC&E) Module", http://www.securityprofiling.com/pdf/sysupdate.sub.--wp.pdf, 36 pgs.
Security Profiling Inc., White Paper, "Intrusion Detection System (IDS)", http://www.securityprofiling.com/pdf/IDSPaperv1-0.pdf, 37 pgs.
Ward, Cheese Beats Crackers, BBC News, May 22, 2001. http://news.bbc.co.uk/2/hi/science/nature/1344344.stm. 3 pgs.
Cisco Systems Announces Intent to Acquire Perfigo, Inc. The Network: Cisco's Technology News Site. http://newsroom.cisco.com/dlls/2004/corp_102104.html. 2 pgs.
Biller, S. R., Regaining Control over your Mobile Users. GIAC Security Essentials Certification (GSEC). Feb. 20, 2005. 21 pgs.
Network security software—StillSecure. Press release details. "StillSecure® Safe Access™ named "Hot Pick" by Information Security Magazine" http://www.stillsecure.com/news_events/prdetails.php?id=18. Aug. 23, 2004. 2 pgs.
Network security software—StillSecure. Press release details. "St. Andrews Presbyterian College enforces endpoint security policy with StillSecure® Safe Access™." http://www.stillsecure.com/news_events/prdetails.php?id=35. Aug. 6, 2004. 3 pgs.
Network security software—StillSecure. Press release details. "Stillsecure® enforces endpoint security compliance with industry's first agent-less solution." http://www.stillsecure.com/news_events/prdetails.php?id=80. Apr. 5, 2004. 4 pgs.
Anti-Vulnerability—Intrusion Detection System (IDS), Security Profiling, Inc., White Paper Version 1.0, Rev. A, [Online]. [Archived Apr. 9, 2003]. Retrieved from the Internet: <URL: http://web.archive.org/web/20030409162639/www.securityprofiling.com/pdf/1-DSPaperv1-0.pdf>, (Apr. 9, 2003), 37 pgs.
U.S. Appl. No. 10/933,504, Non Final Office Action mailed Mar. 4, 2009, 18 pgs.
U.S. Appl. No. 10/933,504, Non-Final Office Action mailed May 13, 2008, 14 pgs.
U.S. Appl. No. 10/933,504, Notice of Allowance mailed Aug. 4, 2009, 6 pgs.
U.S. Appl. No. 10/933,505, Non-Final Office Action mailed Aug. 20, 2009, 12 pgs.
U.S. Appl. No. 10/933,505, Final Office Action mailed Mar. 4, 2009, 11 pgs.
U.S. Appl. No. 10/933,505, Non-Final Office Action mailed Jun. 20, 2008, 9 pgs.
U.S. Appl. No. 10/933,505, Notice of Allowance mailed Mar. 9, 2010, 4 pgs.
U.S. Appl. No. 10/960,755, Final Office Action mailed Jul. 7, 2008, 11 pgs.
U.S. Appl. No. 10/960,755, Non-Final Office Action mailed Dec. 12, 2007, 9 pgs.
U.S. Appl. No. 10/960,755, Notice of Allowance mailed Apr. 15, 2009, 8 pgs.
U.S. Appl. No. 10/963,766, Final Office Action mailed Mar. 10, 2009, 24 pgs.
U.S. Appl. No. 10/963,766, Final Office Action mailed May 15, 2008, 15 pgs.
U.S. Appl. No. 10/963,766, Non-Final Office Action mailed Sep. 29, 2008, 19 pgs.
U.S. Appl. No. 10/963,766, Non-Final Office Action mailed Dec. 6, 2007, 18 pgs.
U.S. Appl. No. 10/994,484, Final Office Action mailed Mar. 12, 2010, 9 pgs.
U.S. Appl. No. 10/994,484, Final Office Action mailed Dec. 8, 2008, 11 pgs.
U.S. Appl. No. 10/994,484, Non Final Office Action mailed May 11, 2009, 10 pgs.
U.S. Appl. No. 10/994,484, Non-Final Office Action mailed Jun. 19, 2008, 7 pgs.
U.S. Appl. No. 11/101,402, Non-Final Office Action mailed Feb. 27, 2009, 30 pgs.
U.S. Appl. No. 11/101,402, Notice of Allowance mailed Dec. 3, 2009, 12 pgs.
U.S. Appl. No. 11/105,363, Non-Final Office Action mailed Jan. 12, 2009, 22 pgs.
CERT (R) Advisory CA-2001-37 Buffer Overflow in UPnP Service on Microsoft Windows, [Online]. [Archived Dec. 14, 2002]. Retrieved from the Internet: <URL: http://web.archive.org/web/20021214113234/www.cert.org/advisories/CA-2001- -37.html>, (Dec. 20, 2001), 4 pgs.
CERT/CC Advisories: 2001, 1-32, [Online]. [Archived Nov. 7, 2001]. Retrieved from the Internet: <URL:http://web.archive.org/web/20011127012540/http://www.cert.org/adv- isories>, (Nov. 7, 2001), 41 pgs.
CERT/CC Advisories: 2001, 30/2004, 2, [Online]. Retrieved from the Internet: <URL: http://www.cert.org/advisories>, (Aug. 9, 2005), 12 pgs.
NETECT (Netecting Network Security)—Company Profile, [Online]. Retrieved from the internet: <URL: www.netect.com>, (1998), 5 pgs.
US-CERT-Technical Cyber Security Alerts, [Online]. Retrieved from the Internet: <URL: http://www.us-cert.gov/cas/techalerts/index.html>, (Aug. 5, 2005), 3 pgs.
Anderson, C., "Verification and validation in industry—a qualitative survey on the state of practice", Carina Anderson & Per Runeson—Empirical Software Endinerring,202, proceedings, 2002 International symposium, (2002), 37-47 pgs.
Berger, D. F, "A Scalable Architecture for Public Key Distribution Acting in Concert with Secure DNS", University of California Riverside, (Aug. 2004), 01-149 pgs.
Moore, R. W, "Preservation Environments", San Diego Supercomputer Center moore@udsc.edu, (Sep. 6, 2003), 01-47 pgs.
Rahm, E., et al., "A survey of approaches to automatic schema matching", The VLDB Journal, The international Journal on very large database, vol. 10 issue 4, (Dec. 2001), 334-350 pgs.
U.S. Appl. No. 10/994,484 Non-Final Office Action mailed Aug. 11, 2010, 11 pgs.
U.S. Appl. No. 10/994,484, Final Office Action mailed Mar. 16, 2011, 9 pgs.
U.S. Appl. No. 14/153,017, Notice of Allowance mailed Jan. 9, 2015.
U.S. Appl. No. 14/153,017, Non-Final Rejection mailed Aug. 1, 2014.
U.S. Appl. No. 14/016,091, Notice of Allowance mailed May 27, 2014.
U.S. Appl. No. 14/016,091, Non-Final Rejection mailed May 12, 2014.
U.S. Appl. No. 13/715,017, Notice of Allowance mailed Sep. 11, 2013.
U.S. Appl. No. 13/715,017, Non-Final Rejection mailed Jul. 31, 2013.
U.S. Appl. No. 12/640,854, Notice of Allowance mailed Apr. 27, 2011.
U.S. Appl. No. 12/640,854, Non-Final Rejection mailed Oct. 6, 2010.
U.S. Appl. No. 14/280,586, Notice of Allowance mailed Nov. 5, 2014.
U.S. Appl. No. 14/280,586, Non-Final Rejection mailed Sep. 8, 2014.
U.S. Appl. No. 12/640,908, Notice of Allowance mailed Nov. 5, 2012.
U.S. Appl. No. 12/640,908, Non-Final Rejection mailed Mar. 15, 2012.
U.S. Appl. No. 12/640,908, Non-Final Rejection mailed Sep. 11, 2011.

| R_ID | POL_ID | ACT_ID | CE_ID |
|------|--------|--------|-------|
| R844 | P48765 | A20458 | CE768 |
| R844 | P48765 | A13423 | CE768 |
| R844 | P48765 | A54633 | CE768 |
| R945 | P49503 | A76464 | CE395 |
| R945 | P49503 | A98747 | CE395 |
| R844 | P09687 | A54633 | CE334 |
| R844 | P09687 | A75474 | CE334 |
| R873 | P09847 | A67321 | CE334 |

| R_ID | POL_ID | CE_ID | PARAM | NEW | OLD(K-1) | OLD(K-2) |
|------|--------|-------|---------|------|----------|----------|
| R844 | P48765 | CE768 | CPU_CNT | 1 | 2 | |
| R873 | P09847 | CE334 | DOM_NAM | acct | eng | |

FIG. 4

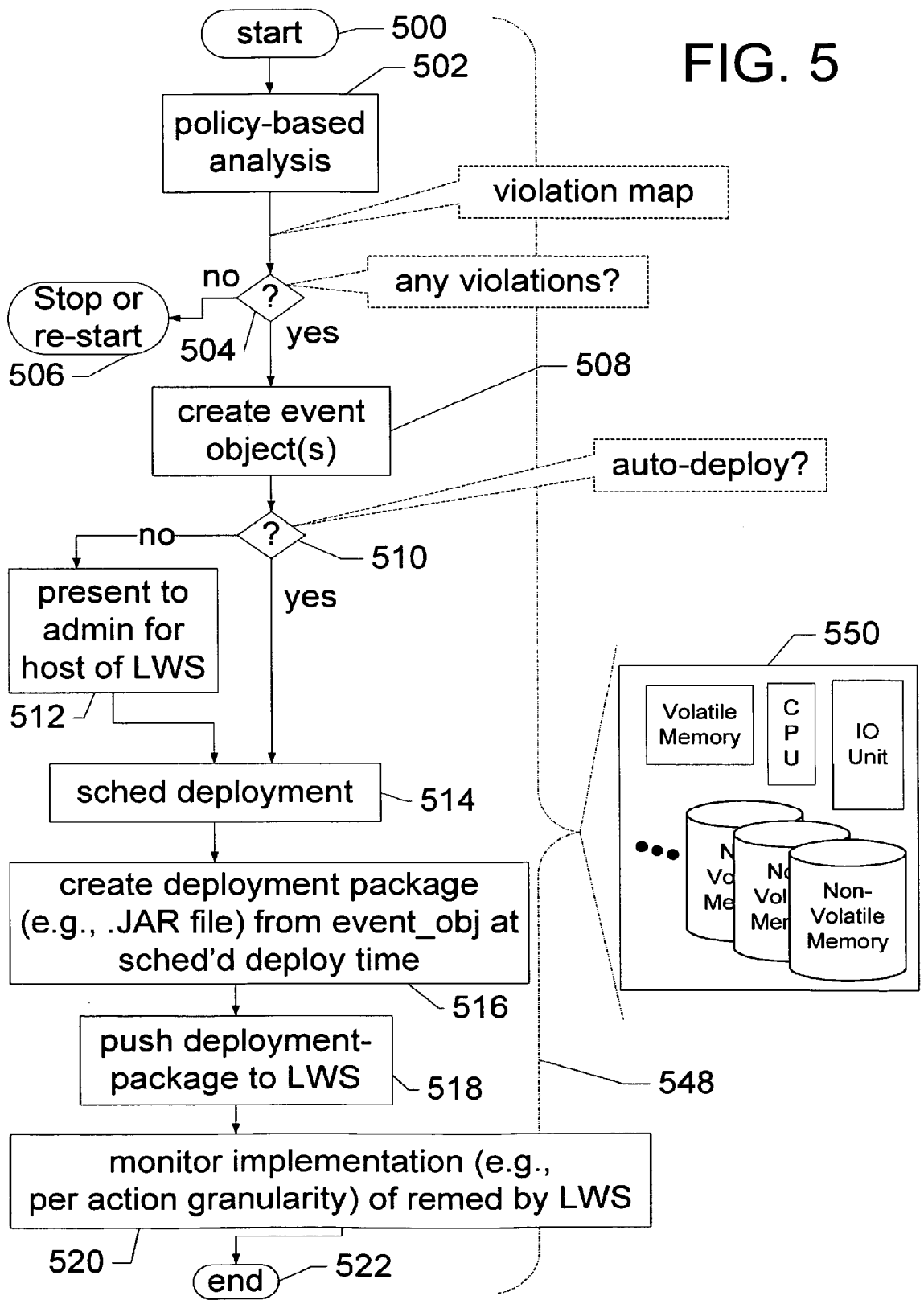

| CE_ID | PARAM | NEW | OLD |
|---|---|---|---|
| 160_999 | CPU_CNT | 1 | null |
| 160_999 | PROCESS_NAME | Outlook® | null |
| 160_999 | DOM_NAM | acct | null |
| 160_999 | OS_TYPE | Windows® 2000 | null |
| * * * | * * * | * * * | |

| CE_ID | PARAM | NEW | OLD |
|---|---|---|---|
| 160_999 | CPU_CNT | 1 | 2 |
| 160_999 | DOM_NAM | acct | eng |
| 160_999 | OS_TYPE | Windows® 2000 | Windows® XP |
| * * * | * * * | * * * | * * * |

ASSET_CHG_LOG
CE_ID
TABLE_NAME
COLUMN_NAME
RECORD_ID
CHANGE_DATE
CHANGED_BY
OLD_VALUE
702 — NEW_VALUE
TRANSACT_CTL_NUM

FIG. 7

POLICY-BASED SELECTION OF REMEDIATION

CROSS-REFERENCE TO RELATED APPLICATIONS

This application is a continuation of U.S. patent application Ser. No. 14/622,753, filed Feb. 13, 2015, now U.S. Pat. No. 9,154,523, which is a continuation of U.S. patent application Ser. No. 14/153,017, filed Jan. 11, 2014, now U.S. Pat. No. 8,984,586, which is a continuation of U.S. patent application Ser. No. 14/016,091, filed Aug. 31, 2013, now U.S. Pat. No. 8,776,170, which is a continuation of U.S. patent application Ser. No. 13/715,017, filed Dec. 14, 2012, now U.S. Pat. No. 8,561,134, which is a continuation of U.S. patent application Ser. No. 12/640,908, filed Dec. 17, 2009, now U.S. Pat. No. 8,341,691, which is a continuation of U.S. patent application Ser. No. 10/933,504, filed Sep. 3, 2004, now U.S. Pat. No. 7,665,119, all of which are hereby incorporated by reference in their entirety for all purposes.

BACKGROUND

1. Field

Embodiments of the present invention generally relate to the field of remediation. In particular, embodiments of the present invention relate to collecting and reporting of parameter values by a security agent installed on an endpoint device that collectively characterize an operational state of the endpoint device to a remote device that enforces security policies with respect to the endpoint device based on one or more of the parameter values.

2. Description of the Related Art

Attacks on computer infrastructures are a serious problem, one that has grown directly in proportion to the growth of the Internet itself. Most deployed computer systems are vulnerable to attack. The field of remediation addresses such vulnerabilities and should be understood as including the taking of deliberate precautionary measures to improve the reliability, availability, and survivability of computer-based assets and/or infrastructures, particularly with regard to specific known vulnerabilities and threats.

Too often, remediation is underestimated as merely the taking of security precautions across a network. While remediation includes such taking of security precautions, it is more comprehensive. It is more accurate to view the taking of security precautions as a subset of remediation.

The taking of precautions is typically based upon policies. Such policies are typically based upon security best practices, e.g., a user shall not install his own software, and/or corporate best practices, e.g., a password must be 8 characters in length. To the extent that taking of precautions is automated, the automation typically samples the value of one or more parameters at a given point in time. Then the values of one or more parameters are presented to a user to assess whether the sampled values pose a cause for concern in the context of any policies which are in place.

SUMMARY

Methods and systems are described for remediating a security policy violation on a computer system. According to one embodiment, information regarding a program-code-based operational state of a host asset is collected by a light weight sensor (LWS) running on the host asset via a survey tool installed on the host asset. The information is transmitted by the LWS to a remote server via an external network. Multiple security policies are enforced by the remote server with respect to the host asset based on the received information including determining whether the program-code-based operational state of the host asset represents a violation of one or more security policies, by evaluating, the received information with respect to the security policies, each of which define at least one parameter condition violation of which is potentially indicative of unauthorized activity on the host asset or manipulation of the host asset making the host asset vulnerable to attack.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 4 depicts a violation table illustrating data relationships in a machine-actionable memory that represent policies that have been violated, according to an embodiment of the present invention.

FIG. 5 is a flow diagram illustrating a policy-based method of remediation selection, and a method of remediation deployment, according to an embodiment of the present invention.

FIG. 6A is a survey table illustrating data relationships in a machine-actionable memory that represent survey data from a current sample, according to an embodiment of the present invention.

FIG. 6B depicts a new-vs-old table, according to an embodiment of the present invention.

FIG. 7 depicts a UML-type database structure, entitled ASSET_CHG_LOG (asset change log) that is used to keep a history of changes in the value of a parameter, according to an embodiment of the present invention.

FIG. 8 depicts a policy information table illustrating data relationships in a machine-actionable memory that represents which policies are active on which of the various host-assets, according to an embodiment of the present invention.

DETAILED DESCRIPTION

Methods and systems are described for remediating a security policy violation on a computer system.

Figure 1:
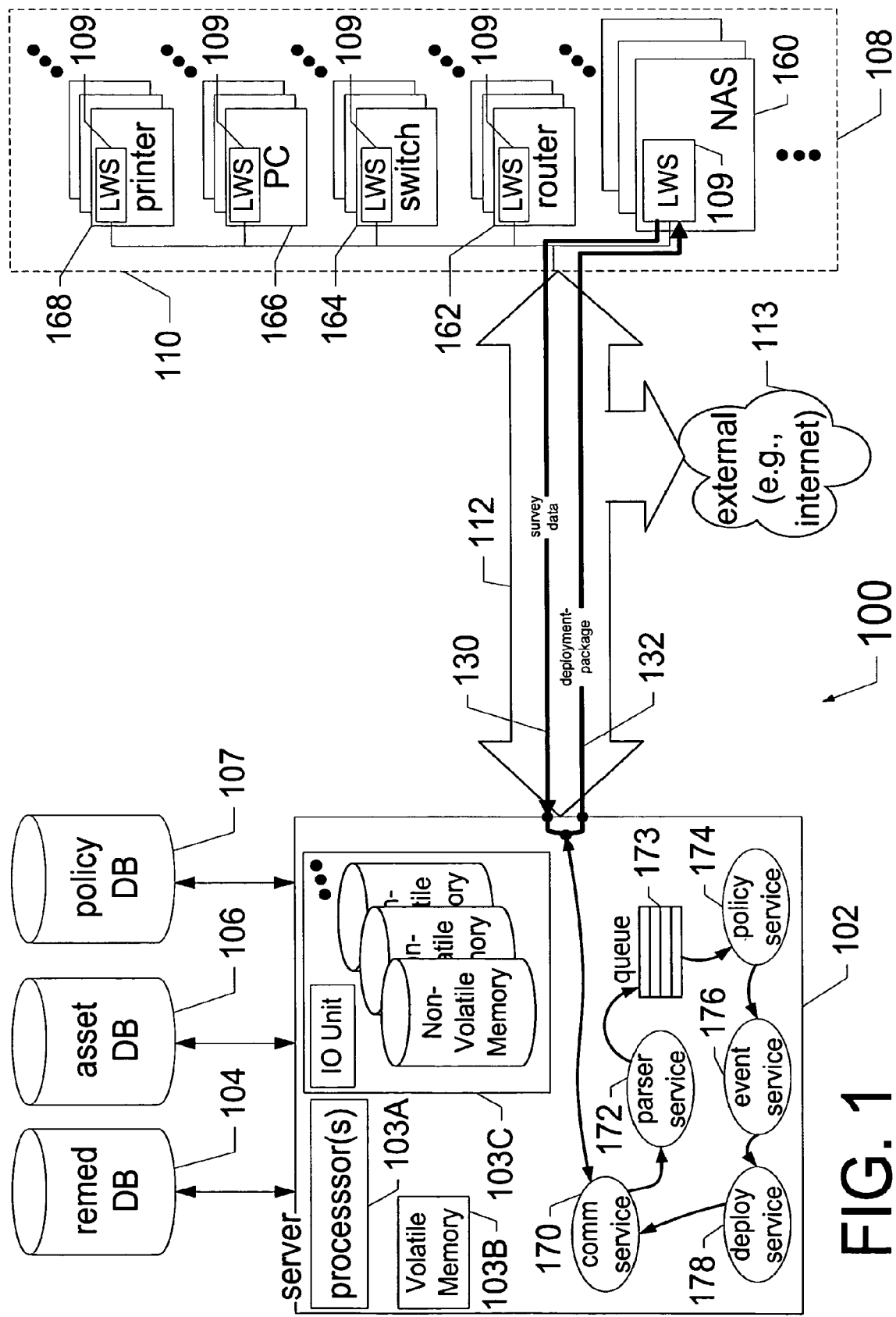
FIG. 1 is a block diagram of an architecture for a policy-based remediation system into which embodiments of the present invention can be incorporated.

FIG. 1 is a block diagram of an architecture 100 for a policy-based remediation system into which embodiments of the present invention can be incorporated, making system 100 itself represent at least one embodiment of the present invention.

Architecture 100 can include: a server 102 (having one or more processors 103A, non-volatile memory 103B and other components 103C); a database (DB) of remediations 104; a DB of assets 106; a DB of policies 106; and a group 108 of networked assets. Generalized networked communication is represented by path 112. Access to entities external to architecture 100, e.g., the Internet (item 113) is available via path 112.

Server 102 can be a component of the network to which group 108 represents assets. Other components 103B typically include an input/output (10) unit, volatile memory (e.g., RAM, etc.), non-volatile memory (e.g., disk drives, etc.), etc. DBs 104, 106 and 107 can be local non-volatile memory resources of server 102.

Examples of assets in group 108 include network-attached storage (NAS) devices 160, routers 162, switches 164, computers (also referred to as PCs) 166, printers 168, etc. Assets in group 108 will be generally be referred to as host-assets 16X. In group 108, host-assets 16X can be generalized as devices having some measure of program-code-based operation, e.g., software, firmware, etc., which can be manipulated in some way via an instance of a communication, e.g., arriving via path 112, and as such can be vulnerable to attack.

Each of the various host-assets 16X in group 108 is depicted as hosting a light weight sensor (LWS) 109. Each LWS 109 and server 102 adopt a client-server relationship. Operation of each LWS 109 can include gathering information about its host-asset 16X and sending such information to server 102; and receiving remediations in an automatically-machine-actionable format from server 102 and automatically implementing the remediations upon its host-asset 16X.

An automatically-machine-actionable remediation can take the form of a sequence of one or more operations that automatically can be carried out on a given host-asset 16X under the control of its LWS 109. Such operations can be invoked by one or more machine-language commands, e.g., one or more Java byte codes.

Server 102 can evaluate the gathered-information regarding host-assets 16X in terms of policies that have been applied, or are active in regard to, host-assets 16X, respectively. Based upon the evaluations, server 102 can select remediations and then send them to host-assets 16X, respectively.

Each host-asset 16X is provided with local programs and/or services (hereafter, survey tools) that can collect values of a plurality of parameters (hereafter, survey data) which collectively characterize an operational state of host-asset 16X at a particular point in time. Each LWS 109 can invoke such survey tools and/or cooperate with periodic scheduling of such survey tools to obtain the survey data. Then each LWS 109 can also transmit the survey data to server 102.

For example, consider LWS 109 of NAS 160, whose transmission of survey data to server 102 is indicated by a communication path 130 superimposed on path 112 in FIG. 1. Continuing the example, once server 102 has selected one or more remediations for NAS 160, server 102 deploys the selected remediation(s) to LWS 109 of NAS 160 as indicated by a communication path 132. The selected remediations can take the form of a deployment package that can include one or more automatically-machine-actionable actions, e.g., a set of one or more Java byte codes for each automatically-machine-actionable action. It is noted that, for simplicity of illustration, only NAS 160 is depicted in FIG. 1 as sending survey data and receiving a deployment package. It is to be understood that instances of paths 130 and 132 would be present for all LWSs 109.

Next, details as to the gathering of information will be discussed and examples of policies provided, followed by discussion of how violations of policies can be automatically determined, and how corresponding remediations can automatically be selected. To accompany the discussion, FIGS. 3A-3B are provided.

Figure 3A:
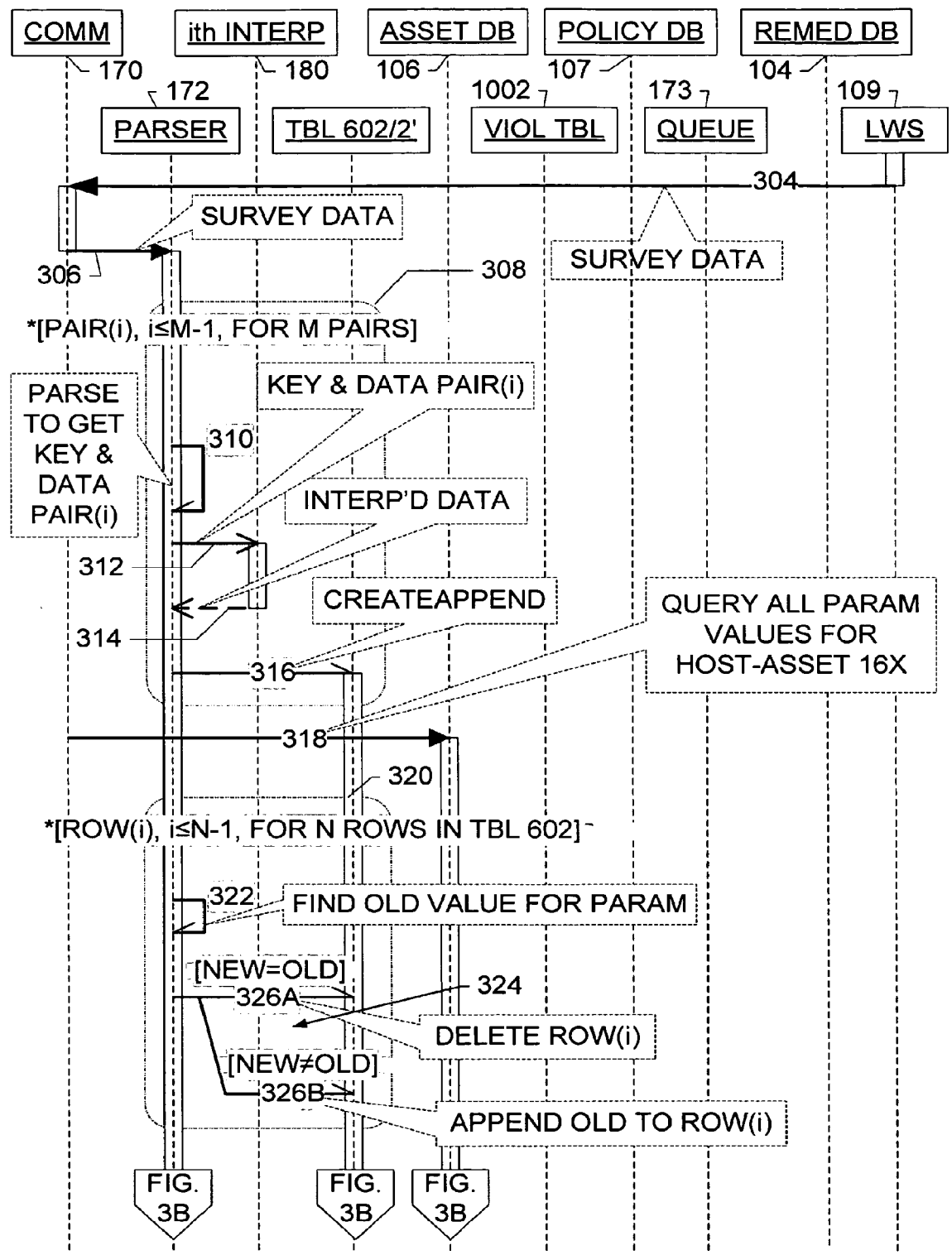
FIG. 3A is a UML-type sequence diagram depicting a first part of a method of determining which policies are violated, according to an embodiment of the present invention.
Figure 3B:
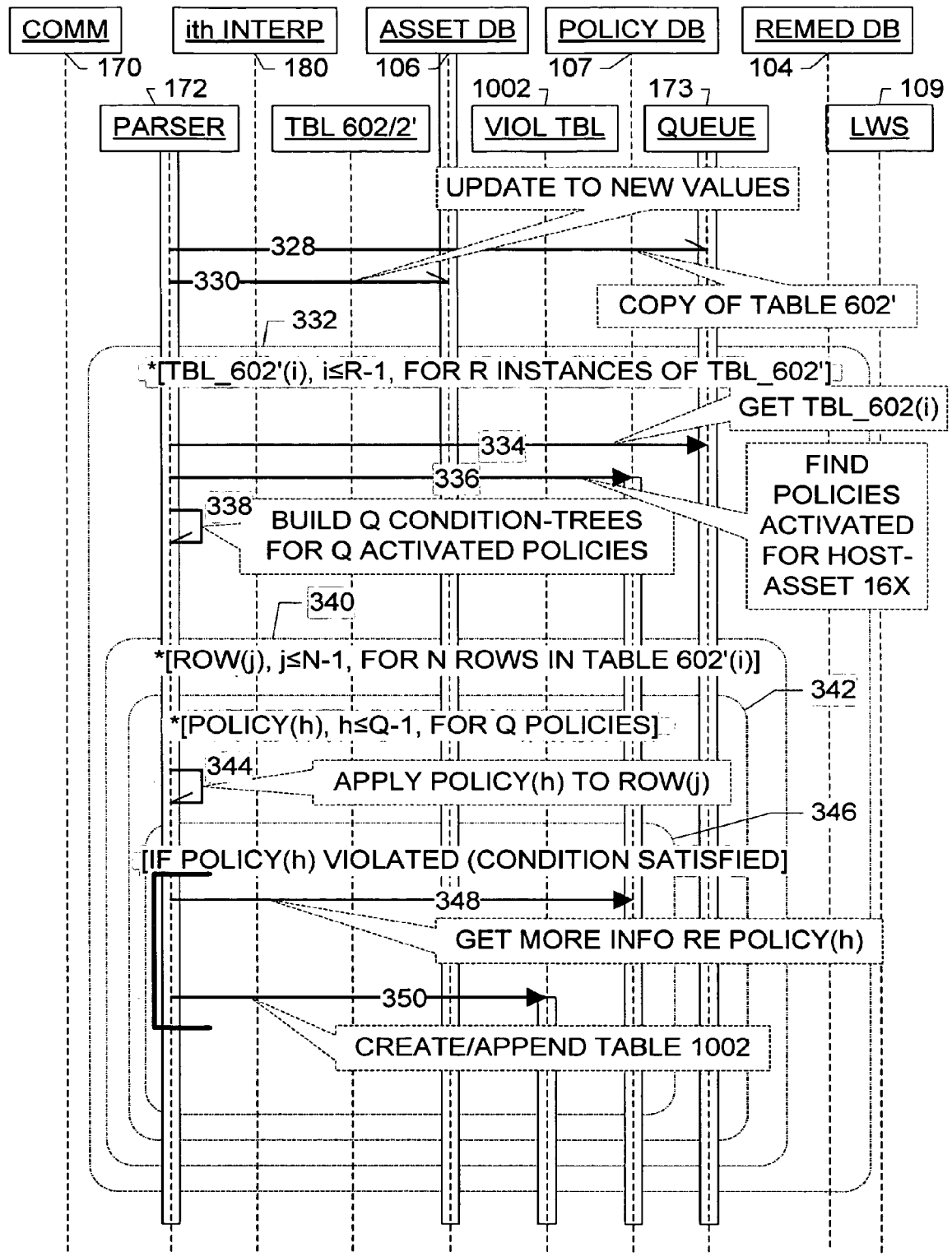
FIG. 3B is a UML-type sequence diagram depicting a second part of a method of determining which policies are violated, according to an embodiment of the present invention.

FIGS. 3A-3B are a UML-type sequence diagrams depicting a method of determining which policies are violated, according to at least one embodiment of the present invention.

Server 102 and each LWS 109 can, e.g., be provided with services (not depicted in LWSs 109 but see corresponding communication service 170 in server 102), e.g., J2EE-type services, that carry out communication therebetween. For example, see message 304 in FIG. 3A sent from a given instance of LWS 109 to communication service 170.

Survey data from an instance of LWS 109 (which is transferred via path 130) can be formatted in a variety of ways. For example, within the survey data, a portion representing a particular parameter can be preceded by a service key, e.g., a string of data that denotes the service on host-asset 16X that collected the portion. Server 102 can be provided with a parser service 172, a J2EE-type service, that can parse the survey data. In the context of FIG. 3A, communication service 170 can pass the survey data to parser server 172 at message 306.

Parser service 172 can sequentially examine the survey data, looking for pairs of service keys and associated data portions. Continuing the example, parser service 172 can recognize a service key (k), recognize as being associated therewith a data portion (k), e.g., found between service key (k) and a subsequent service key (k+1), and call an interpretation service (not depicted) corresponding to service key (k) to interpret data portion (k). Parser service 172 can take the output of the respective interpretation services and build a survey table of new parameter values. This can be an iterative process. One of ordinary skill in the art would understand that there are other ways to process the survey data.

In the context of FIG. 3A, such an iterative loop is denoted by item No. 308 and is given the label "*[PAIR(i), i.ltoreq.M−1, FOR M PAIRS]." In UML notation, the asterisk (*) denotes iteration, and iteration of loop 308 will continue while the statement within the square brackets is true. Here, the statement for loop 308 indicates that looping iterates for each PAIR(i) of a service key and its related portion of the survey data (or, in other words the i.sup.th PAIR) while (so long as) the variable, i, is less than or equal to M−1 (namely, i.ltoreq.M−1). The boundary M denotes the total number of pairs of service keys and related data present in the survey data.

At self-message 310 in FIG. 3A, parser service 172 can parse the survey data to obtain the i.sup.th pair, also known as PAIR(i). At message 312, parser service 172 calls an interpretation service according to the value of the service key in PAIR(i). Hence, such an interpretation service is generally referred to as an i.sup.th interpretation service 180 in FIG. 3A. At message 314, i.sup.th interpretation service sends back interpreted data to parser service 172. In response, at message 316, parser service 172 can create survey table 602 if this is the first pass through loop 308 and survey table 602 does not yet exist. Otherwise, if survey table 602 already exists, then parser service 172 can append the interpreted data to survey table 602.

FIG. 6A is an example of a survey table 602 illustrating data relationships in a machine-actionable memory that represent new survey data from the present sample, according to at least one embodiment of the present invention.

More particularly, survey table 602 illustrates data relationships created by parser service 172, e.g., in volatile memory 103B, based upon the survey data, according to at least one embodiment of the present invention. As such, survey table 602 illustrates a particular type of machine-actionable memory arranged according to a particular data structure.

Survey table 602 can be described as a CE_ID:PARAM: NEW:OLD mapping, where CE_ID is an acronym for an identification (ID) of a given LWS 109 loaded on a given host-asset 160X, and where each instance of a host-asset 16X can be described as a client environment (CE). Each row of table 602 can include: a CE_ID field; a PARAM field (name of parameter); a NEW field (new value of the parameter); and an OLD field (old value of the parameter). Each row of table 602 represents a mapping between a value for the CE_ID, a name or identification (ID) of a parameter, a new value thereof obtained during the present sampling (k) by the survey tool(s), and an old value thereof obtained during a preceding sampling (e.g., k−1).

Here, continuing the example of survey data from path 130, it is assumed that NAS 160 has CE_ID=160.sub.-999 for (merely) the purposes of illustration. As will be discussed below, values of many different types of parameters are gathered from the various host-assets 160X, respectively. Further continuing the example of survey data from path 130, survey table 602 assumes that the survey data includes: the parameters CPU_CNT, PROCESS_NAME, DOM_NAM and OS_TYPE as being reported in the survey data; and the corresponding values 1, Outlook®, acct (abbreviation for account) and Windows®. 2000, respectively. Initially, null values are stored in the OLD fields. Typically, many other parameters will be present in the survey data and reflected in table 602. Here, only four samples of parameters and values thereof are presented, for simplicity of illustration.

Server 102, e.g., via parser service 172, can then assess whether there has been a change in the values of the parameters in the survey data from the present sample (k) relative to a preceding sample, e.g., the immediately preceding sample (k−1). This can be done by server 102 querying asset DB 106 for all parameter records that pertain to a given host-asset 16X, and then comparing the new values (k) against the old values (e.g., k−1) to identify those that have changed. An architecture for DB 106 will now be discussed.

FIGS. 2A, 2B, 2C and 2D are linked database structures illustrating data relationships in a machine-actionable memory, e.g., asset DB 106, that represent parameter values for the various host-assets 160X, according to at least one embodiment of the present invention.

Figure 2A:
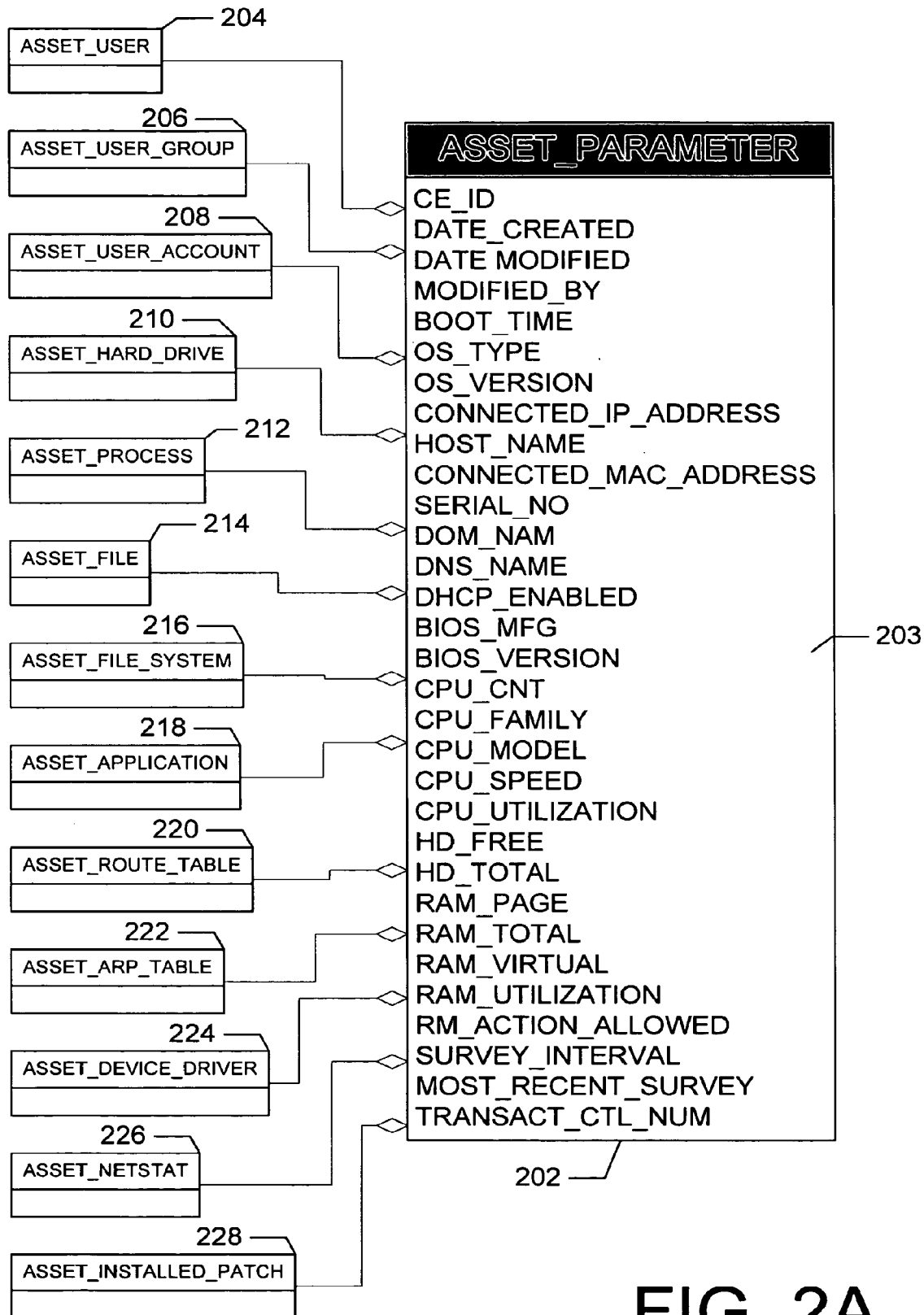
FIGS. 2A, 2B, 2C and 2D are linked database structures illustrating data relationships in a machine-actionable memory that represent parameters of a host-asset, according to an embodiment of the present invention.

More particularly, FIG. 2A depicts an asset-parameter (ASSET_PARAMETER) database structure 202. As such, database structure 202 illustrates a particular type of machine-actionable memory arranged according to a particular data structure.

Unlike survey table 602, database structure 202 (and also database structures 204-228) are depicted as UML-type database structures. This should be understood to mean that database structure 202 represents an at least M×N array, e.g., M rows and N columns where M and N are integers. A row (not depicted) of the array denoted by database structure 202 corresponds to parameter values of a given host-asset 16X. The columns (not depicted) of the array denoted by database structure 202 correspond to various parameters. The N labels in box 203 denote the parameters, and hence there is a column in the array denoted by database structure 202 for each label in box 203.

Box 203 indicates that database structure 202 can include, e.g., the following parameters: CE_ID (again, the ID of the particular instance of LWS 109); DATE_CREATED (date that the asset was created); DATE MODIFIED (last date that the asset was modified); MODIFIED_BY (who modified the asset); BOOT_TIME (time at which the most recent boot-up occurred); OS_TYPE (type of operating system); OS_VERSION (version of the operating system); CONNECTED_IP_ADDRESS (IP address assigned to host-asset 160X); HOST_NAME (name of host-asset 160X); CONNECTED_MAC_ADDRESS (MAC address assigned to host-asset 160X); SERIAL_NO (serial number assigned to host-asset 160X); DOM_NAM (domain name of host asset 160X); DNS_NAME (DNS name assigned to host asset 160X); DHCP_ENABLED (is DHCP, namely dynamic host control protocol, enabled?); BIOS_MFG (name of the manufacturer of the BIOS); BIOS_VERSION (version of the BIOS); CPU_CNT (number of processors); CPU_FAMILY (processor's family of architectures, e.g., Centrino®; CPU_MODEL (model of processor); CPU_SPEED (speed of processor); CPU_UTILIZATION (percentage utilization of the processor); HD_FREE (free space on the hard disk); HD_TOTAL (total space of the hard disk); RAM_PAGE (page size for RAM); RAM_TOTAL (total size of RAM); RAM_VIRTUAL (amount of virtual RAM); RAM_UTILIZATION (percentage utilization of RAM); RM_ACTION_ALLOWED (remote actions allowed); SURVEY_INTERVAL (interval of at which sampling to obtain survey data takes place); MOST_RECENT_SURVEY (DTS, namely date-time stamp, of most recent survey data); and TRANSACT_CTL_NUM (a surrogate key to uniqueness of rows in database structure 202).

One of ordinary skill in the art will recognize that values for those parameters listed by box 203 of database structure 202, a subset thereof and/or other parameters can be gathered by the survey tools. Appropriate sets of parameters depend upon the nature of the technology found in host-assets 16X, the granularity of information which an administrator of architecture 100 desires, etc. The same is true for database structures 204-228.

Figure 2B:
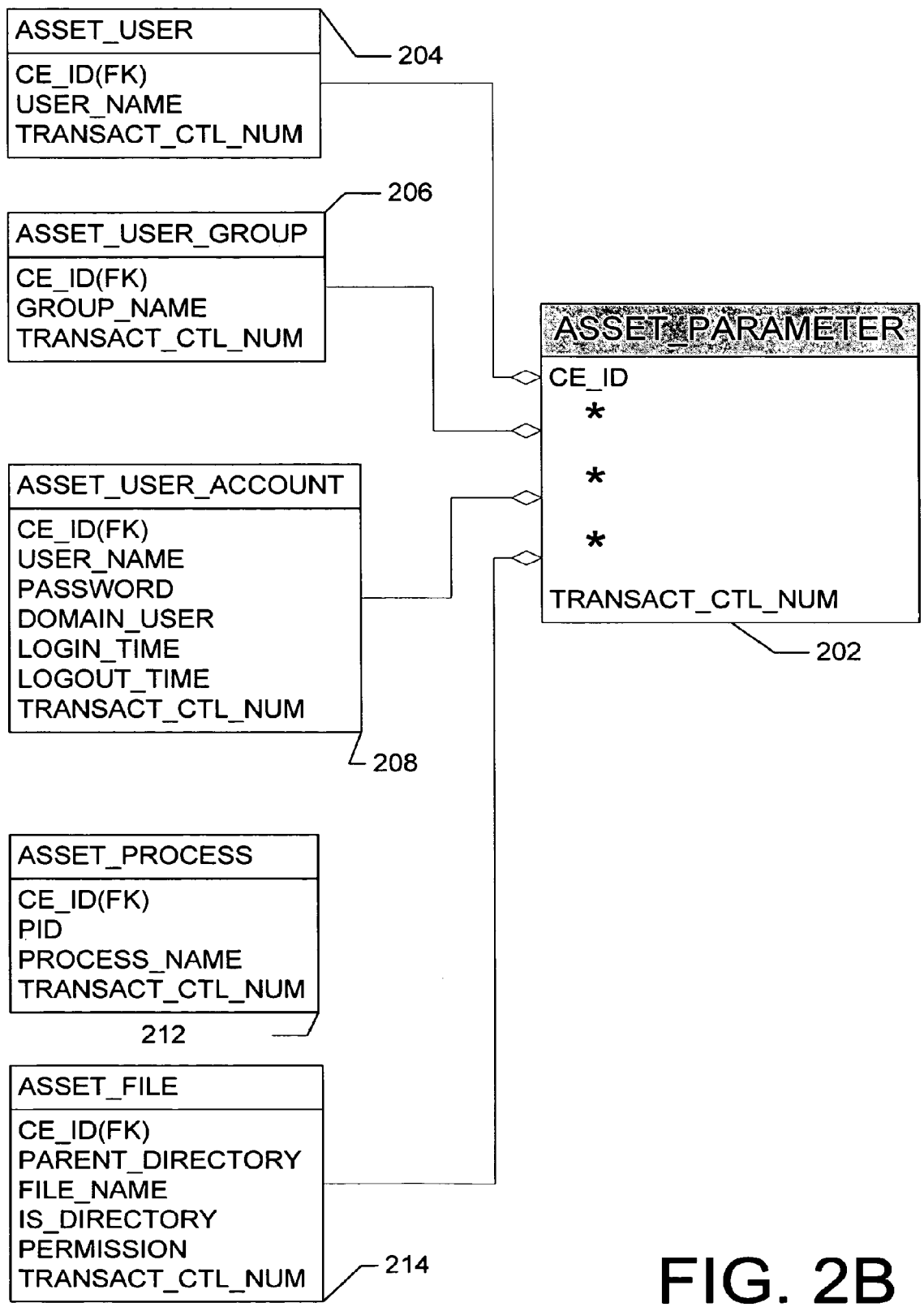

FIG. 2A also depicts UML-type database structures 204-228. FIG. 2B is a version of FIG. 2A that depicts database structures 204, 206, 208, 212 and 214 in more detail and database structure 202 in less detail. As such, each of database structures 204, 206, 208, 212 and 214 illustrates a particular type of machine-actionable memory arranged according to a particular data structure.

Consider, for example, database structure 204, which is entitled asset-user (ASSET_USER). Each row in database structure 204 can include a CE_ID field (used as a foreign key relative to database structure 204), a USER_NAME field (user's name), and a TRANSACT_CTL_NUM field. It should be understood that multiple users can potentially use a given host-asset 16X, most with permission but some possibly without permission. Hence, different rows in the array represented by database structure 204 can identify different users of the various host-assets 16X, respectively.

Database structure 204 is connected to database structure 202 via a path that terminates in a open diamond (.diamond.) at database structure 202. The open diamond denotes aggregation. In terms of ASSET_USER database structure 204, multiple instances or values of the parameter USER_NAME can exist for a given asset many of whose parameters are stored in ASSET_PARAMETER database structure 202. Such aggregation also can include the characteristic that if rows for a given asset are deleted in ASSET_PARAMETER database structure 202, then the corresponding one or more rows in ASSET_USER database structure 204 are not necessarily deleted as a consequence. Each of database structures 206-228 is also connected to database structure 202 via a path that terminates in a open diamond (.diamond.) at database structure 202.

Database structure 206 is entitled asset-user-group (ASSET_USER_GROUP). Each row in database structure 206 can include: a CE_ID field (used as a foreign key relative to database structure 204); a GROUP_NAME field (user-group's name); and a TRANSACT_CTL_NUM field. Database structure 206 is an accommodation for the possibility that multiple user-groups can be given permission to use a given host-asset 16X. Different rows in the array represented by database structure 206 can identify different user groups for the various host-assets 16X, respectively.

Database structure 208 is entitled asset-user-account (ASSET_USER_ACCOUNT). Each row in database structure 208 can include: a CE_ID field (used as a foreign key relative to database structure 204); a USER_NAME field (user's name); a password (PASSWORD) field; a DOMAIN_USER field (user's domain); a LOGIN_TIME field (time of most recent login); LOGOUT_TIME field (time of most recent logout); and a TRANSACT_CTL_NUM field. Database structure 208 can store information about the activity of the multiple users that can be given permission to use a given host-asset 16X. Different rows in the array represented by database structure 208 can store data regarding different users' activity on the various host-assets 16X, respectively.

Database structure 212 is entitled asset-process (ASSET_PROCESS). Each row in database structure 212 can include: a CE_ID field (used as a foreign key relative to database structure 204); a P_ID field (ID of process); a PROCESS_NAME field (name of process); and a TRANSACT_CTL_NUM field. Database structure 212 is an accommodation for the possibility that multiple processes can be running on a given host-asset 16X. Different rows in the array represented by database structure 212 can store data regarding different processes running on the various host-assets 16X, respectively.

Database structure 214 is entitled asset-file (ASSET_FILE). Each row in database structure 214 can include: a CE_ID field (used as a foreign key relative to database structure 204); a PARENT_DIRECTORY field (path to file location); a FILE_NAME field (name of file); an IS_DIRECTORY field (is file actually a directory?); a PERMISSION field (read/write permission, DTS, etc.); and a TRANSACT_CTL_NUM field. Database structure 214 is an accommodation for the possibility of desiring to determine the presence of a particular file in a given location, the status of the file's permissions, etc. Hence, rows in the array represented by database structure 214 can store information about various files that are loaded on the various host-assets 16X, respectively.

Figure 2C:
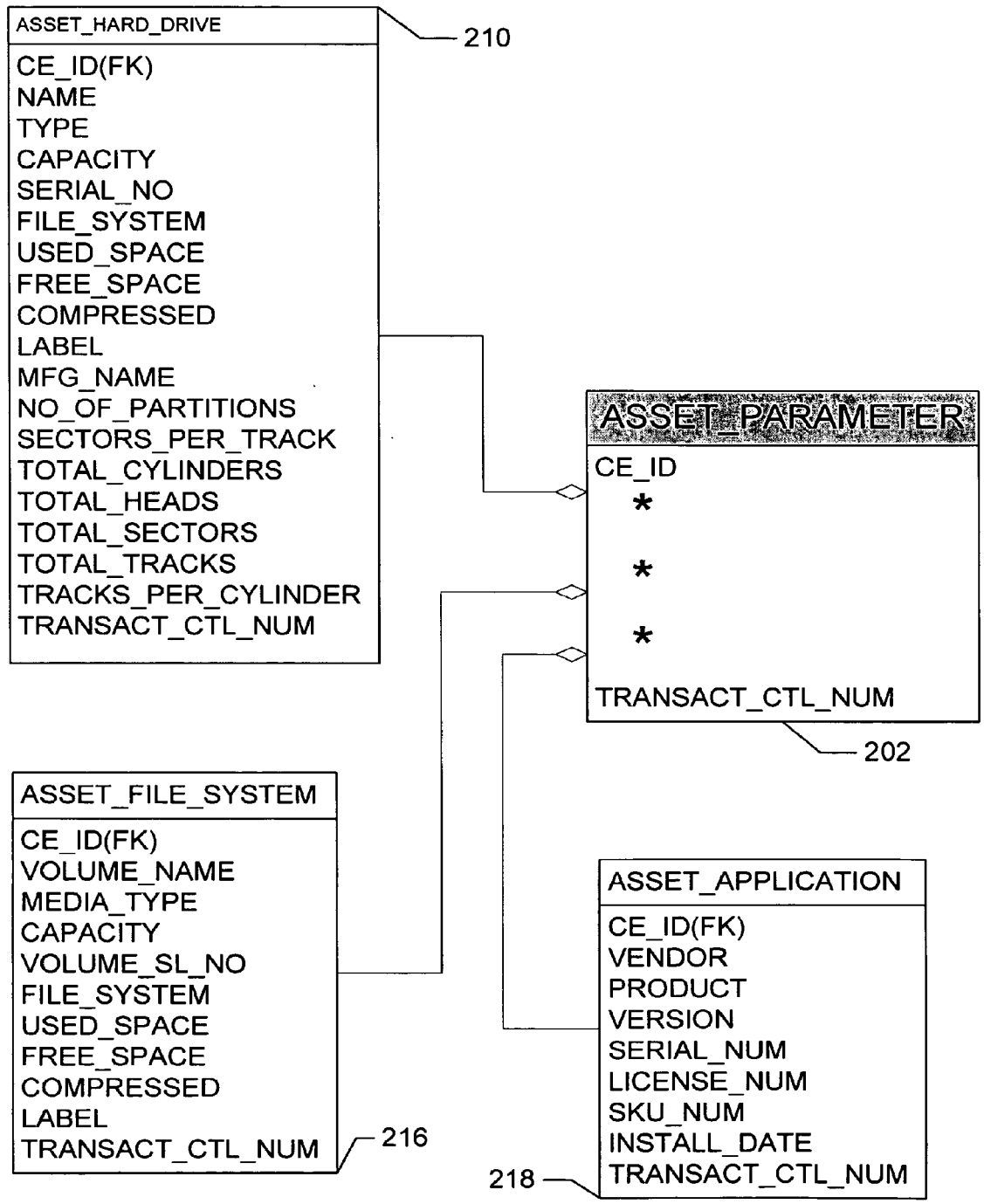

FIG. 2C is a version of FIG. 2A that depicts database structures 210, 216 and 218 in more detail and database structure 202 in less detail. As such, each of database structures 210, 216 and 218 illustrates a particular type of machine-actionable memory arranged according to a particular data structure.

Database structure 210 is entitled asset-hard-drive (ASSET_HARD_DRIVE). Each row in database structure 210 can include: a CE_ID field (used as a foreign key relative to database structure 204); a NAME field (hard drive name); a TYPE field (type of hard drive); a CAPACITY field (storage capacity of the hard drive); a SERIAL_NO field (serial number assigned to the hard drive); a FILE_SYSTEM field (type of file system to which the hard drive is configured); a USED_SPACE field (amount of storage used); a FREE_SPACE field (amount of storage remaining unused); a COMPRESSED field (are the files compressed?); a LABEL field (label given to the hard drive); a MFG_NAME field (name of the hard drive's manufacturer); a NO_OF_PARTITIONS field (number of partitions into which the hard drive is divided); a SECTORS_PER_TRACK field (number of sectors per track); a TOTAL_CYLINDERS field (total number of cylinders or platters); a TOTAL_HEADS field (total number of heads); a TOTAL_SECTORS field (number of sectors per track); a TOTAL_TRACKS field (total number of tracks); a TRACKS_PER_CYLINDER field (number of tracks per cylinder); and a TRANSACT_CTL_NUM field. Database structure 210 is an accommodation for the possibility that there can be multiple hard drives on a given host-asset 16X. Different rows in the array represented by database structure 210 can store data regarding various hard drives which form parts of the various host-assets 16X, respectively.

Database structure 216 is entitled asset-file-system (ASSET_FILE_SYSTEM). Each row in database structure 216 can include: a CE_ID field (used as a foreign key relative to database structure 204); a VOLUME_NAME field (name of storage volume); a MEDIA_TYPE field (type of media); a CAPACITY field (storage capacity of the file system); a VOLUME_SL_NO field (volume serial number); a FILE_SYSTEM field (type of file system); a USED_SPACE field (amount of storage in the file system that has been used); a FREE_SPACE field (amount of storage in the file system remaining unused); a COMPRESSED field (are the files compressed?); a LABEL field (label given to the file system); and a TRANSACT_CTL_NUM field. Database structure 216 is an accommodation for the possibility that there can be multiple file systems in use on a given host-asset 16X. Different rows in the array represented by database structure 216 can store data regarding different file-systems used by the various host-assets 16X, respectively.

Database structure 218 is entitled asset-application (ASSET_APPLICATION). Each row in database structure 216 can include: a CE_ID field (used as a foreign key relative to database structure 204); a VENDOR field (name of the application's vendor); a PRODUCT field (name of application); a VERSION field (version of the application); a SERIAL_NUM field (serial number assigned to the application); a LICENSE_NUM field (number of license for the application); a SKU_NUM field (SKI, namely stock-keeping unit, number); an INSTALL_DATE field (date that the application was installed); and a TRANSACT_CTL_NUM field. Database structure 218 is an accommodation for the possibility that there can be multiple applications loaded on a given host-asset 16X. Different rows in the array represented by database structure 218 can store data regarding different applications loaded on the various host-assets 16X, respectively.

Figure 2D:
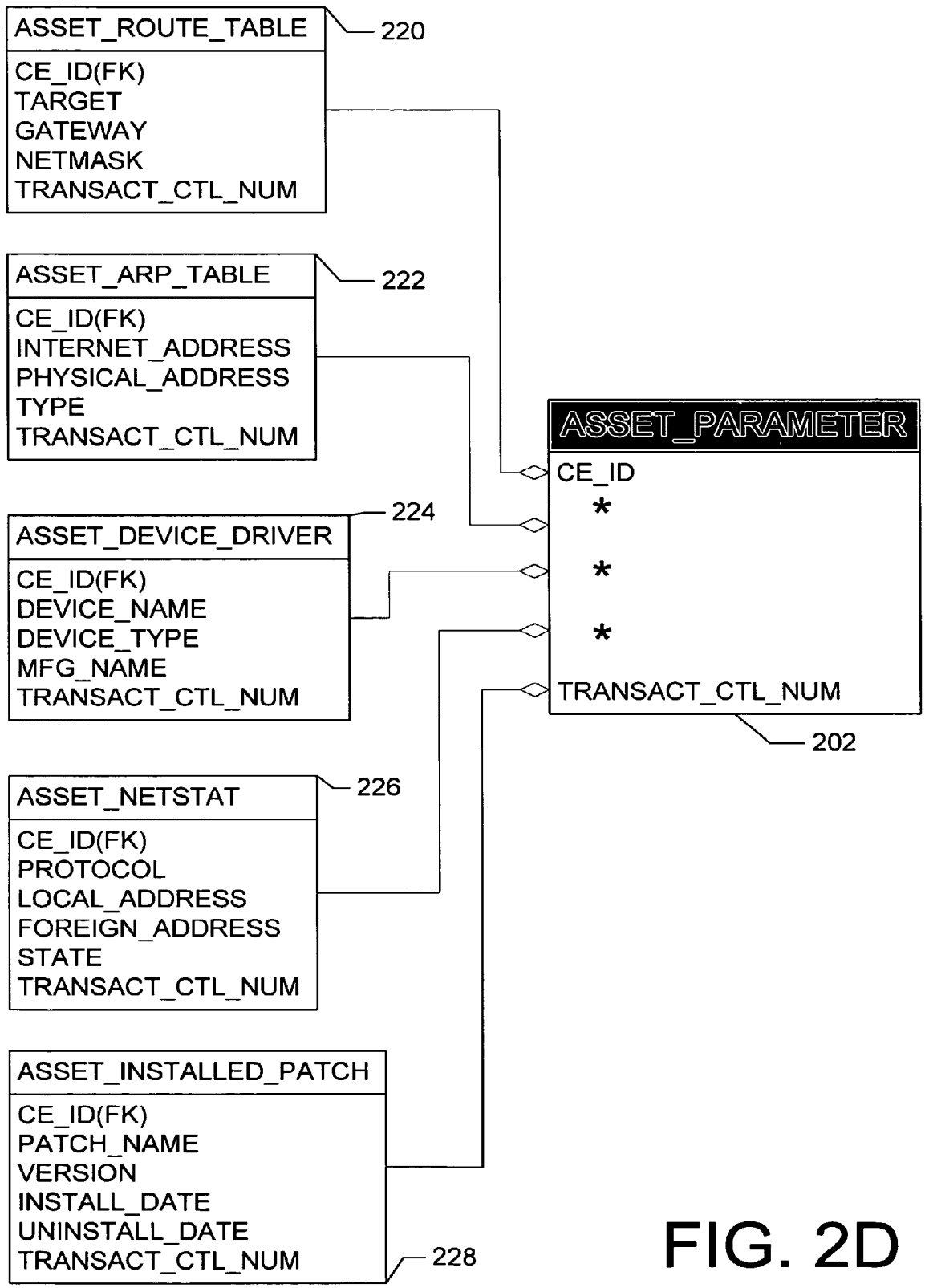

FIG. 2D is a version of FIG. 2A that depicts database structures 220, 222, 224, 226 and 228 in more detail and database structure 202 in less detail. As such, each of database structures 220, 222, 224, 226 and 228 illustrates a particular type of machine-actionable memory arranged according to a particular data structure.

Database structure 220 is entitled asset-route-table (ASSET_ROUTE_TABLE). Each row in database structure 220 can include: a CE_ID field (used as a foreign key relative to database structure 204); a TARGET field (address to which communication directed); a GATEWAY field (gateway through which communication proceeds; a NETMASK field (bit mask used to tell how much of an IP address identifies the subnetwork that the given host-asset 16X is on and how much identifies the host-asset 16X itself); and a TRANS-ACT_CTL_NUM field. Database structure 220 is an accommodation for the possibility that there can be multiple routes by which communication can be sent from a given host-asset 16X. Different rows in the array represented by database structure 220 can store information regarding various routes of communication being used by the various host-assets 16X, respectively.

Database structure 222 is entitled asset-ARP-table (AS-SET_ARP_TABLE). Each row in database structure 222 can include: a CE_ID field (used as a foreign key relative to database structure 204); an INTERNET_ADDRESS field (internet address, e.g., IP address, of host-asset 16X involved in a communication); a PHYSICAL_ADDRESS field (address of hardware on host-asset 16X involved in a communication); a TYPE field (ARP mapping dynamic or static); and a TRANSACT_CTL_NUM field. Database structure 222 is an accommodation for the possibility that there can be multiple components on a given host-asset 16X that are engaged in external communication. Different rows in the array represented by database structure 222 can store data regarding different various components on the various host-assets 16X, respectively, that are engaged in communication.

Database structure 224 is entitled asset-device-driver (AS-SET_DEVICE_DRIVER). Each row in database structure 224 can include: a CE_ID field (used as a foreign key relative to database structure 204): a DEVICE_NAME field (name of driver); a DEVICE_TYPE field (type of driver); a MFG_NAME field (name of driver's manufacturer); and a TRANSACT_CTL_NUM field. Database structure 224 is an accommodation for the possibility that there can be multiple drivers loaded on a given host-asset 16X. Different rows in the array represented by database structure 212 can store data regarding different processes running on the various host-assets 16X, respectively. Different rows in the array represented by database structure 224 can store information regarding the various drivers loaded on the various host-assets 16X, respectively.

Database structure 226 is entitled asset-netstat (ASSET_NETSTAT). Each row in database structure 226 can include: a CE_ID field (used as a foreign key relative to database structure 204); a PROTOCOL field (name of protocol, e.g., TCP, UDP, etc.); a LOCAL_ADDRESS field (port being used for an instance of communication by a given host-asset 16X); a FOREIGN_ADDRESS field (an address of an entity with which the given host-asset 16X is in communication): a STATE field (state, e.g., listening, of the communication in which an entity on a given host-asset 16X is engaged); and a TRANSACT_CTL_NUM field. Database structure 226 is an accommodation for the possibility that there can be multiple instances of external communication in which components on a given host-asset 16X can be engaged. Different rows in the array represented by database structure 226 can store information regarding various instances of communication in which the various host-assets 16X, respectively, are engaged.

Database structure 228 is entitled asset-installed-patch (ASSET_INSTALLED_PATCH). Each row in database structure 228 can include: a CE_ID field (used as a foreign key relative to database structure 204): a PATCH_NAME field (name of installed patch); a VERSION field (version of the installed patch): an INSTALL_DATE field (date that the patch was installed); an UNINSTALL_DATE field (date that the patch was uninstalled); and a TRANSACT_CTL_NUM field. Database structure 228 is an accommodation for the possibility that there can be multiple patches installed on a given host-asset 16X. Different rows in the array represented by database structure 228 can store data regarding various patches installed on the various host-assets 16X, respectively.

Discussion now returns to parser service 172. To review, parser service 172 can query asset DB 106 for all parameter records pertaining to a given host-asset 16X for which survey data has been received and parsed to form survey table 602. In the context of FIG. 3A, such a query is illustrated as a message 318 from parser service 172 to asset DB 106.

Then parser service 172 can iteratively (e.g., row-by-row for survey table 602) compare the new parameter values (k) against the old parameter values (e.g., k−1) to identify those that have changed. Such an iterative technique is illustrated in FIG. 3A as loop 320. The result of such an iterative technique (or, in other words, the result of loop 320) is that table 602 is converted into what can be described as a new vs. old table.

Loop 320 of FIG. 3A is given the label "*[ROW(i), i.ltoreq.N−1, FOR N ROWS IN TBL 602]." Iteration of loop 320 will continue for each ROW(i) of table 602' while (so long as) the variable, i, is less than or equal to N−1 (namely, i.ltoreq.N−1). The boundary N denotes the total number of rows in table 602'.

In loop 320, parser service 170 searches through parameter values obtained via message 318 for an old value corresponding to the parameter of row(i) of table 602. Next, FIG. 3A illustrates a branching message 324. As indicated by the label "[NEW=OLD]," if parser service 170 finds a corresponding old value and if the old value equals the new value, then branch 326A of message 324 is taken, by which parser service 174 deletes row(i) from table 602. Else, as indicated by the label "[NEW≠OLD]," if parser service 170 finds a corresponding old value and if the old value does not equal the new value, then branch 326B of message 324 is taken, by which parser service 174 appends the old value to the OLD field of row(i) in table 602. If no corresponding old parameter value is found, then parser service 170 can ignore the new value. This could be handled by changing the label of branch 324A to be [NEW=OLD or NEW=NULL].

FIG. 6B depicts such a new versus old (hereafter, new-vs-old) table 602' that illustrates a revised version of survey table 602, according to at least one embodiment of the present invention. As such, survey table 602' illustrates a particular type of machine-actionable memory arranged according to a particular data structure.

Extending the example of survey data from path 130, it is assumed in FIG. 6B that parser service 172 has: recognized changes in the parameters CPU_CNT, DOM_NAM, and OS_TYPE; appended the corresponding old values thereof; determined that no change has occurred in the parameter PROCESS_NAME; and deleted the row for the unchanged parameter PROCESS_NAME.

After it finishes the iterative new vs. old comparison that results in new-vs-old table 602', parser service 172 can place a copy of new-vs-old table 602' (or an object representing table 602') in an asynchronous queue 173, e.g., a FIFO buffer, for a policy service 174 (to be discussed below). In the context of FIG. 3B, this is illustrated as message 328 from parser service 172 to queue 173. Queue 173 can absorb variations in the rate at which parser service 172 generates instances of new-vs-old table 602'.

Substantially concurrently, parser service 172 can (according to those rows, if any, remaining in table 602') also overwrite corresponding records in database structures 202-228 with the new parameter values and append new records to an installment history, e.g., as embodied by a suitable database structure on asset DB 106. In the context of FIG. 3B, this is illustrated as message 330 from parser service 172 to asset DB 106.

FIG. 7 depicts an example of a suitable UML-type database structure 702, entitled ASSET_CHG_LOG (asset change log) that is used to keep the history of changes in the value of a parameter, according to at least one embodiment of the present invention. Each row in database structure 228 can include: a CE_ID field (used as a foreign key relative to database structure 204); a TABLE_NAME field (name of the primary table in which the parameter is tracked); a COLUMN_NAME field (name of the parameter); a RECORD_ID field (value of the TRANSACT_CTL_NUM field in the primary table); a CHANGE_DATE field (DTS for change tracked by the given row in database structure 228); a CHANGED_BY field (entity initiating change); an OLD field (value of the parameter as of the immediately preceding, relative to point in time indicated by the value in the CHANGE_DATE field, sample); a NEW field (value of the parameter as of the point in time indicated by the value in the CHANGE_DATE field); and a TRANSACT_CTL_NUM field. Structure 702 can be used to track the history of changes to each of parameters for all of the assets tracked in ASSET_PARAMETER database structure 202.

The copies of the various instances of table 602' in queue 173 can be sequentially processed by a policy service 174 of server 102. Policy service 174 can obtain an instance of new-vs-old table 602' from queue 173 and then evaluate the changed data in new-vs-old table 602' against each policy that is activated for the given host-asset 16X. This can be iterative. In the context of FIG. 3B, such iteration is illustrated by loop 332.

Loop 332 of FIG. 3B is given the label "*[TBL_602'(i), I.ltoreq.R−1, FOR R INSTANCES OF TBL_602]." Iteration of loop 332 will continue for each TBL_602'(i) of queue 173 while (so long as) the variable, i, is less than or equal to R−1 (namely, i.ltoreq.R−1). The boundary R denotes the total number of instances of table 602' in queue 173. Policy service 174 gets a copy of table 602'(i) via message 334 to queue 173.

Before discussing loop 332 further, a discussion of policies is provided. A policy can define as a condition of a given parameter either of the following: one or more potential values of a given parameter; or one or more values based upon the given parameter. When the condition of a policy is satisfied, this is potentially indicative of unauthorized activity or manipulation of the given host-asset 16X upon which the policy has been activated.

As a first policy example, consider a policy which is violated (or, in other words, whose condition is satisfied) if the value of the CONNECTED_IP_ADDRESS parameter of ASSET_PARAMETER database structure 202 is not one of the IP addresses on an approved list. If such a policy is satisfied, it could potentially (though not necessarily) indicate unauthorized actively on the given host-asset 16X.

As a second policy example, consider a policy which is violated (or, in other words, whose condition is satisfied) if an authorized user of a VPN (virtual private network) is logged in during normal business hours (where VPN usage is for this user is typically expected to be after business hours) and if the given host-asset is connected to the accounting wireless domain (where the user is authorized only to access the engineering and sales domains). If such a policy is satisfied, it could potentially indicate that a known user is engaging in unauthorized activity.

As a third policy example, consider a policy which is violated (or, in other words, whose condition is satisfied) if there is a change in the CPU_CNT parameter of ASSET_PARAMETER database structure 202. If such a policy is satisfied, this could be indicative of one or more processors having been stolen from or added to the given host-asset 16X, Either type of change can indicate potential unauthorized manipulation of the given-host 16X, and the latter may potentially be a precursor of forthcoming unauthorized activity on the given host-asset 16X.

Discussion now returns to loop 332 of FIG. 3B and policy service 174. To evaluate the changed data in new-vs-old table 602' against each policy that is activated for the given host-asset 16X, policy service 174 can do the following: it can query policy DB 107 for all policies activated for the given host-asset 16X, e.g., by indexing according to the CE_ID value therefore; then it can build a condition-tree, e.g., in non-volatile memory 103B, for the condition of each policy that is active for a given host-asset 16X; and then it can evaluate each row of new-vs-old table 602' according to each condition-tree, which results in a violation table. An example of a violation table is depicted in FIG. 8. In the context of FIG. 3B, policy service 174 queries for the activated policies via message 336 to policy DB 107.

FIG. 8 depicts an activated policy table illustrating data relationships in a machine-actionable memory that represents which policies are active on which of the various host-assets 16X, according to at least one embodiment of the present invention.

More particularly, FIG. 8 depicts a policy information (or, in other words, an R_ID:POL_ID:CE_ID) table 802, illustrating data relationships in a machine-actionable memory, e.g., in policy DB 107, that maps policies to remediations, and also maps policies to assets. As such, policy information table 802 illustrates a particular type of machine-actionable memory arranged according to a particular data structure.

Policy information (pol-info) table 802 includes the columns R_ID, POL_ID, ACT_ID and CE_ID. A value in the R_ID-column indicates an identification (ID) of a remediation (R_ID) suited to remediating the circumstances of a violated policy. A value in the POL_ID-column indicates an ID of a policy (POL_ID). A value in the ACT_ID-column indicates an ID of action or operation that automatically can be carried out on a given host-asset 16X to at least in-part implement a remediation. A value in the CE__D-column indicates an ID of a given host-asset 16X.

An example of constraints upon Pol-info table 802 would be as follows: each policy can map to only one remediation; a remediation, however, can map to one or more policies; each policy can map to one or more assets; etc. Pol-info table 802 can be created by the administrator of architecture 100, and edited/expanded as policies change and/or are added. Extending the example illustrated via the specific details of new-vs-old table 602' in FIG. 6B, it is assumed in FIG. 9A that records denoted by items 804 and 806 corresponding to the policies violated by the data of the new-vs-old table 602'.

Returning to the context of FIG. 3B, at self-message 338, policy service 174 builds the condition trees for those policies indicated by Pol-info table 802 as being activated for the given host-asset 16X. For the sake of discussion, it is assumed that each message 338 generates a total of Q condition trees for Q activated policies. Next, at loop 340, policy service 174 evaluates each condition-tree according to the values of each row of new-vs-old table 602'(i). Before discussing loop 340, a discussion of condition trees is provided.

Figure 9A:
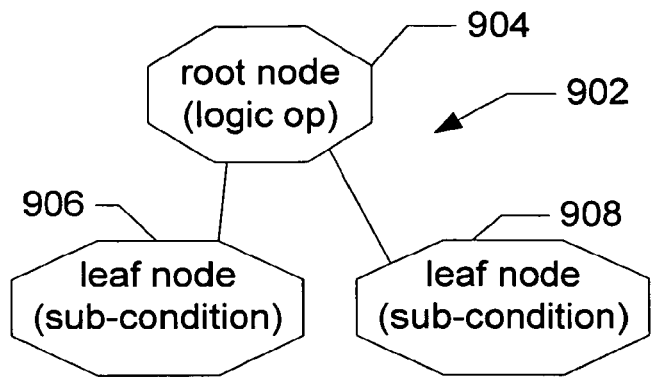
FIG. 9A is a diagram of a condition-tree, according to an embodiment of the present invention.

FIG. 9A is a diagram of a condition-tree 902, according to at least one embodiment of the present invention. Condition-tree 902 depicts data relationships in volatile memory 103B. As such, condition-tree 902 depicts a particular type of machine-actionable memory, according to at least one embodiment of the present invention. Condition-tree 902 is an at least two-level hierarchical tree structure that includes: a root node 904; and leaf node 906; and one or more optional leaf nodes 908. There can be N leaf nodes, where N is an integer and N.gtoreq.1. While not limited to a specific maximum value, N typically will fall in a range 2.ltoreq.N.ltoreq.10.

Root node 904 can represent a logical operator, e.g., logical AND, logical OR, logical NOT, etc. leaf nodes 906 and 906 can be statements representing subconditions of the policy's condition. Stated differently, condition tree 902 is a representation of a condition that itself is a collection of conditions. Evaluation of the statements representing the sub-conditions according to the values in a row of new-vs-old table 602' yields an indication of the statement being true or false, e.g., a logical one or a logical zero.

Figure 9B:
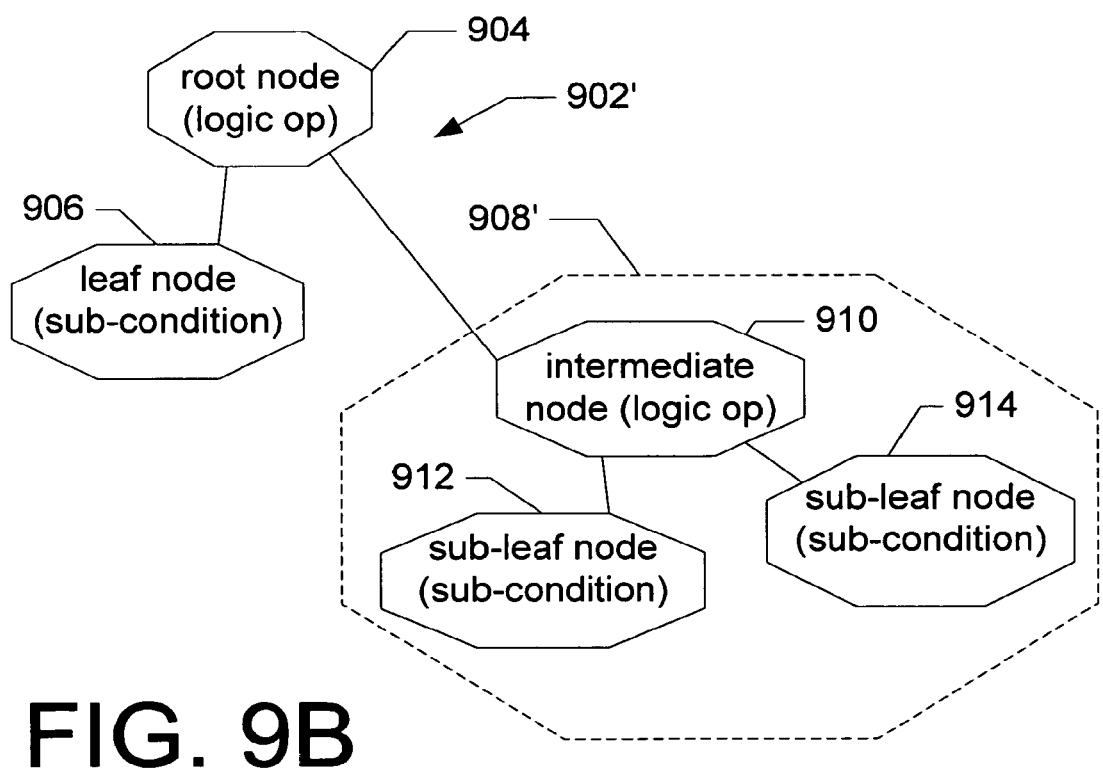
FIG. 9B is a diagram of another version of the condition-tree of FIG. 9A, according to an embodiment of the present invention.

FIG. 9B is a diagram of a version 902' of condition-tree 902, according to at least one embodiment of the present invention. In FIG. 9B, node 908 is depicted as a multi-part node 908', which can include: an intermediate node 910, that reports to root node 904; a sub-leaf node 12; and one or more sub-leaf nodes 914. There can be P sub-leaf nodes, where P is an integer and P.about.1. Similarly, sub-leaf nodes 912 and 914 can be statements representing sub-sub-conditions of the sub-condition represented by leaf node 908. And similarly, evaluation of the statements representing the sub-sub-conditions according to the values in a row of the new-vs-old table 602' yields an indication of the statement being true or false. One or more of sub-leaf nodes 912 and 914 can be themselves be multi-part nodes, respectively.

Via the use of a condition tree 902/902', a policy whose condition is satisfied when a collection of sub-conditions are coincidentally satisfied can be quickly evaluated. Moreover, such condition-trees 902/902' can quickly and easily be configured and/or reconfigured.

In prior rule-based decision-making software, conditions of a rule are typically represented in source code as if-then-else constructs, rather than as a machine-actionable memory. Coding of such constructs is relatively more difficult, and as is revising such constructs. In addition, if-then-else constructs are sequential in nature. In contrast, condition-trees 902/902' exploit the parallelism in a condition. Accordingly, condition trees 902/902' are significantly faster on average to evaluate than a corresponding if-then-else construct.

Stated differently, condition-trees represent an object-oriented representation, where the level of granularity is at the node-level (nodes are the objects) into which a condition is decomposed. In contrast, while an if-then-else construct according to the Background Art might be coded using a high-level object-oriented programming language, at best the condition as a whole of the construct is treated as the sole object. If-then-else constructs are less granular representations of conditions than are condition-trees.

Returning to the first policy example, a corresponding condition-tree could have as simple leaf nodes reporting to the root node the sub-conditions CONNECTED_IP_ADDRESS=given_member_of approved_list for each member of the approved list. The root node for this condition tree could be a logical OR operator.

Returning to the second policy example, a corresponding condition-tree could have as the root node the logical AND operator, and as simple leaf nodes reporting thereto the sub-conditions VPN_CONNECTION (true or false) and USER_VPN_AUTHORIZED (true or false). The condition tree could also have the following multi-part nodes reporting to the root node: the logical AND operator as the intermediate node to which report simple sub-leaf nodes representing the sub-sub conditions DOM_NAM=given_member_of approved_list for each member on the list; and the logical operator NOT as the intermediate node to which reports a simple sub-leaf node representing the sub-sub condition NORMAL_VPN_WINDOW=time_range given_member_of approved_list.

Returning to the third policy example, a corresponding condition-tree could have as the root node the local NOT operator, and as a simple leaf node reporting thereto the sub-condition CPU_CNT_NEW=CPU_CNT_OLD.

The ordinarily-skilled artisan will recognize other ways to construct condition-trees for each of the first, second and third policy examples. In general, policy conditions are typically susceptible to a plurality of constructions.

Similar to how an appropriate set of parameters will vary (again, depending upon the nature of the technology found in host-assets 16X, the granularity of information thereabout that is desired, etc.), so too will vary the nature and complexity (e.g., the number of sub-conditions whose satisfaction needs to coincide) of policy conditions. Moreover, the complexity of policies will also vary according to the desired degree to which satisfaction of the policy is a precursor of forthcoming unauthorized activity on or manipulation of the given host-asset 16X. In other words, condition complexity (and thus policy complexity) will vary according to how early a warning of potential forthcoming unauthorized activity or manipulation the administrator of architecture 100 desires to receive.

Patterns of seemingly unrelated parameter values or changes in the values thereof can warn of or foreshadow potential forthcoming unauthorized activity or manipulation. In this respect, identifying unauthorized activity or manipulation from a pattern of seemingly unrelated parameter values is analogous to the differential diagnosis of a patient's illness by a physician where the patient presents with a plurality of symptoms, many of which can seem unrelated.

Generally, the earlier the warning that is desired, the greater is the number of seemingly unrelated parameter values (or changes in the values thereof) that are included as factors of the condition. Hence, earlier warnings typically dictate policies whose conditions concern a relatively greater number of parameters.

It should be noted that there can be one or more policies which have as the sole condition, or as one or more of the sub-conditions thereof, either of the following definitions: one or more of the potential values defined for the given parameter represent aberrations from normal values of the given parameter; or one or more of the potential values defined for the given parameter represent normal values of the given parameter. Generally, the earlier the warning, the more likely it is that that the latter definition (in which potential values representing normal values) will chosen for one or more sub-conditions of the policy.

A condition for a policy can include as one or more factors (or, in other words, describe) at least one of the following concerning at least one parameter: existence; non-existence; a range of potential values thereof; change in the value thereof; no-change in the value thereof; a maximum amount of change in the value thereof; a minimum amount of change in the value thereof; a maximum potential value thereof; a minimum potential value thereof; being equal to a specific value thereof; not being equal to a specific value thereof; presence on a list; absence from a list; etc.

Some additional examples of policies will be briefly mentioned. Again, satisfaction of the conditions of such policies can potentially be indicative of unauthorized activity or manipulation of the given host-asset 16X.

As a fourth policy example, consider a policy which is violated (or, in other words, whose condition is satisfied) if: the value of the BOOT_TIME parameter from of ASSET_PARAMETER database structure 202 is not consistent with the value of the MOST_RECENT_SURVEY parameter of ASSET_PARAMETER database structure 202. Satisfaction of this condition potentially can indicate unauthorized manipulation of the system clock on the given host-asset 16X.

As a fifth policy example, consider a two-sub-condition policy which is violated (or, in other words, whose condition is satisfied) if: the CPU_CNT parameter of ASSET_PARAMETER database structure 202 changes; and the DHCP_ENABLED parameter of ASSET_PARAMETER database structure 202 is true. Servers typically do not enable DHCP, using instead a static IP address. Where the given host-asset 16X is a server, satisfaction of this condition potentially can indicate that that a malefactor who added the processor to the server desires to keep the extra processor invisible.

As a sixth policy example, consider a multi-sub-condition policy which is violated (or, in other words, whose condition is satisfied) if: the value of the CPU_UTILIZATION parameter of ASSET_PARAMETER database structure 202 exhibits a spike; and there is a pattern that the value of the RAM_UTILIZATION parameter of ASSET_PARAMETER database structure 202 exhibits a spike and then returns substantially to the previous value. Satisfaction of this condition potentially can indicate that a user is hiding use of some volatile memory and/or a rogue application is attempting to minimize the amount of time that it exposed.

As a seventh policy example, consider a policy which is violated (or, in other words, whose condition is satisfied) if: the value of the RAM_TOTAL parameter of ASSET_PARAMETER database structure 202 is less than a previous value. Satisfaction of this condition potentially can indicate unauthorized removal (e.g., theft) of volatile memory device(s) from the given host-asset 16X or that some of the volatile memory is deliberately being hidden. Alternatively, if the value of the RAM_TOTAL parameter increases, then this potentially can indicate unauthorized addition of volatile memory device(s) from the given host-asset 16X.

As an eighth policy example, consider a policy which is violated (or, in other words, whose condition is satisfied) if: the value of DOM_NAM parameter of ASSET_PARAMETER database structure 202 is a null value (indicating that the given host-asset 16X does not belong to the domain); and the value of the USER_NAME parameter of ASSET_USER database structure 204 is not on a list of users approved for the given host-asset 16X. Satisfaction of this condition potentially can indicate an unauthorized user.

As a ninth policy example, consider a policy which is violated (or, in other words, whose condition is satisfied) if: the calculated value of a hard disk's size (which can be based upon the values of the SECTORS_PER_TRACK and TOTAL_TRACKS parameters of ASSET_HARD_DRIVE database structure 210) does not substantially match the value of the CAPACITY parameter of ASSET_HARD_DRIVE database structure 210. If there are a negligible number of bad sectors, then satisfaction of this condition potentially can indicate a portion of the hard disk storage space is being hidden.

As a tenth policy example, consider a policy which is violated (or, in other words, whose condition is satisfied) if: the value of the GATEWAY parameter of ASSET_ROUTE_TABLE database structure 220 has changed from the preceding value, which is assumed to be a default value. Satisfaction of this condition potentially can indicate a communication which a malefactor hopes will go unnoticed.

As an eleventh policy example, consider a policy which is violated (or, in other words, whose condition is satisfied) if: the value of the SERIAL_NUM parameter in ASSET_APPLICATION database structure 218 changes. Where the unit having the change serial number is a processor, satisfaction of the condition potentially can indicate an unauthorized swap of processors. Due to manufacturing tolerances, otherwise identical instances of processors can exhibit different tolerances to ambient temperature; here, a malefactor could have swapped a processor with a lower ambient temperature tolerance for a processor with higher ambient temperature tolerance.

As a twelfth policy example, consider a policy which is violated (or, in other words, whose condition is satisfied) if: the DHCP_ENABLED parameter of ASSET_PARAMETER database structure 202 is false. As noted, servers typically do not enable DHCP, but all other computer-based devices typically do enable DHCP. Where the given host-asset 16X is not a server, satisfaction of this condition potentially can indicate that that a malefactor has statically set the IP address of the given host-asset 16X in order to login to the network fraudulently as another user.

As a thirteenth policy example, consider a policy which is violated (or, in other words, whose condition is satisfied) if: the value of the PROCESS_NAME parameter in ASSET_PROCESS database structure 212 is not on a list of processes approved for the given host-asset 16X. Satisfaction of this condition potentially can indicate processes that should not be running on the given host-asset 16X.

As a fourteenth policy example, consider a policy which is violated (or, in other words, whose condition is satisfied) if: the value of the PRODUCT parameter of ASSET_APPLICATION database structure 218 is on a list of applications not approved for the given host-asset 16X. Satisfaction of this condition could indicate that an unwanted file-sharing program, e.g., KAZAA, is installed irrespective of whether it is running as a process.

As a fifteenth policy example, consider a policy which is violated (or, in other words, whose condition is satisfied) if: the value of the LOCAL_ADDRESS parameter of ASSET_NETSTAT database structure 226 includes a port value that is not on a list of ports approved for listening by the given host-asset 16X. Satisfaction of this condition could indicate that an unauthorized web server is running on the given host-asset 16X.

As a sixteenth policy example, consider a policy which is violated (or, in other words, whose condition is satisfied) if: the value of the DEVICE_TYPE parameter of ASSET_DEVICE_DRIVER database structure 224 indicates that the driver is on list of unauthorized driver types, e.g., including USB-type drivers. Some information security best practices call for there to be no removable storage devices connected to networked computers. An common example of a small, easily concealed removable storage media is a USB-type memory stick. Satisfaction of this policy's condition potentially can indicate that a removable storage device, e.g., USB-type memory stick, is connected to the given host-asset 16X.

As a seventeenth policy example, consider a policy which is violated (or, in other words, whose condition is satisfied) if: the value of a given parameter, e.g., the PRODUCT parameter of ASSET_APPLICATION database structure 218, is absent from a list of permissible values; and the value of the given parameter is absent from a list of impermissible values. Satisfaction of this condition potentially can indicate the presence of an entity, e.g., an application, on the given host-asset 16X which the administrator of architecture 100 has yet to encounter.

Discussion now returns to loop 340 of FIG. 3B and policy service 174. Nested within loop 340 is a loop 342, and nested within loop 342 is a prerequisite-dependent group 346 of messages.

Again, at loop 340, policy service 174 evaluates each condition-tree according to the values of each row of new-vs-old table 602'(i). Loop 340 of FIG. 3B is given the label "*[ROW (j), j.ltoreq.N−1, FOR N ROWS IN TABLE 602'(i)]." Iteration of loop 332 will continue for each TBL_602'(i) of queue 173 while (so long as) the variable, i, is less than or equal to R−1 (namely, i.ltoreq.R−1). Again, the boundary N denotes the total number of rows in table 602'(i).

Nested loop 342 of FIG. 3B is given the label "*[POLICY (h), h.ltoreq.Q−1, FOR Q POLICIES]." Iteration of loop 342 will continue for each POLICY(h) for table 602(i) while (so long as) the variable, h, is less than or equal to Q−1 (namely, h.ltoreq.Q−1). Again, the boundary N denotes the total number of rows in table 602'(i). At self-message 344, policy service 174 applies policy(h) to row(j) of table 602'(i). Then nested group 346 is entered.

Group 346 of FIG. 3B is given the label "[IF POLICY(h) VIOLATED (CONDITION SATISFIED)]," which represents the pre-requisite to group 346. Messages 348 and 350 are included in group 346. Messages 348 and 350 occur if the prerequisite is met. More particularly, if self-message 344 determines that policy(h) has been violated, then policy service can query policy DB 107 for more information regarding policy(h), as indicated by message 348. Then policy service 174 can create a violation table (to be discussed in more detail below), e.g., in volatile memory 103B, to represent the additional information regarding policy(h). Creation of the violation table is represented by message 350. If the violation table has already been created in a previous iteration of loop 340, then policy service 174 appends the additional information regarding policy(h) to the existing at message 350.

An example of a suitable violation table can be an adaptation of new-vs-old table 602'. Information that policy service 174 can add to new-vs-old table 602' can include: an ID of the policy (POL_ID) that was violated; and an ID of a remediation (R_ID) suited to remediating the circumstances of the violated policy.

FIG. 4 depicts a violation table 402 illustrating data relationships in a machine-actionable memory that represent policies that have been violated, according to at least one embodiment of the present invention. In other words, violation table 402 illustrates a particular type of machine-actionable memory arranged according to a particular data structure.

In violation table 402, each row can identify (and thus map between) a policy that has been violated, the one or more parameters whose value (or values or changes therein) violated the policy, the new value (k) and at least the preceding corresponding value (k−1). Each row of table 402 can include: a CE_ID field (as in new-vs-old table 602'); at least one PARAM field (similar to new-vs-old table 602'); a NEW field (as in new-vs-old table 602'); at least one OLD field (similar to new-vs-old table 602'); a R_ID field; and a POL_ID field.

As noted above, policy service 174 can produce violation table 402 by adapting new-vs-old table 602', e.g., appending IDs of the violated policies (POL_IDs) and IDs of the associated remediations (R_IDs) to the corresponding rows of the parameters responsible for the violations, respectively. Extending the example illustrated via the specific details of new-vs-old table 602' in FIG. 6B, it is assumed in FIG. 4 that policies concerning the parameters CPU_CNT and DOM_NAM have been violated. Accordingly, information from the records corresponding to items 904 and 906 in R_ID:POL_ID:CE_ID table 902 has been appended to new-vs-old table 602' to form violation table 402. For simplicity of illustration, values for the column labeled OLD(K−2) have not been depicted, but such values could be present.

After completing violation table 402, policy service 174 can pass violation table 402 to an event service 176. Again, each row in violation table 402 can be described as representing a remediation for the given host-asset 16X. Server 102 can send remediations to the given LWS 109 via event service 176 and a deployment service 178, e.g., as follows.

For example, event service 176 can prepare an event object corresponding to each row of violation table 402. Thus, each event object represents a remediation for the given host-asset 16X. Event service 176 can pass each event object to a deployment service 178, which can prepare a deployment package for each event object and then send the respective deployment package to the given LWS 109 via communication service 170.

The above discussion can be summarized by referring to FIG. 5. FIG. 5 is a flow diagram illustrating a policy-based method of remediation selection, and a method of remediation deployment, according to at least one embodiment of the present invention.

Flow in FIG. 5 begins at block 500 and proceeds to block 502, which has the label "policy-based analysis." The preceding discussion has described a policy-based analysis that yields violation map 402. This can be contrasted with what can be described as a vulnerability-based analysis.

Examples of vulnerability-based analysis are two related copending applications that are assigned to the same assignee as the present application. The two related copending applications are: U.S. patent application Ser. No. 10/897,399 having a U.S. filing date of Jul. 23, 2004; and U.S. patent application Ser. No. 10/897,402 that also has a U.S. filing date of Jul. 23, 2004. The entirety of the '399 patent application is hereby incorporated by reference. The entirety of the '402 patent application is hereby incorporated by reference.

From block 502, flow proceeds in FIG. 5 to decision block 504, where server 102 can, e.g., via event service 176, check whether any policies activated for the given host-asset 16X have been violated. For example, this can be done by event service 176 checking if violation table has any non-null rows. If not, then flow can proceed to block 506 where flow stops or re-starts, e.g., by looping back to block 500. But if there is at least one non-null row in violation table 402, then can flow proceed to block 508, where event service 176 can create an event object (e.g., EVENT) corresponding to each non-null row in violation table 402. Flow can then proceed to decision block 510.

At decision block 510, server 102, e.g., via deployment service 178, can determine whether to automatically deploy each event object. As each is produced, event service 176 can pass the event object EVENT(i) to deployment service 178. Deployment service can then determine whether the object EVENT(i) should be automatically deployed, e.g., based upon an automatic deployment flag set in a record for the corresponding policy stored in policy DB 107. Alternatively, a field labeled AUTO_DEP can be added to violation table 402, which would be carried forward in each object EVENT (i). The administrator of architecture 100 can make the decision about whether the remediation for a policy should be automatically deployed.

If automatic-deployment is not approved for the remediation corresponding to the violated policy of object EVENT(i), then flow can proceed to block 512 from decision block 510. At block 512, deployment service can present information about object EVENT(i) to, e.g., the administrator of architecture 100, who can then decide whether or not to deploy the remediation. Flow proceeds to block 514 from block 512. But if automatic-deployment is approved for object EVENT(i), then flow can proceed directly to block 514 from decision block 510.

At block 514 of FIG. 5, at time at which to deploy object EVENT(i) is determined. Flow proceeds to block 516, where a deployment package D_PAK(i) corresponding to object EVENT(i) is prepared, e.g., as of reaching the time scheduled for deploying object EVENT(i). Deployment package D_PAK(i) can represent the remediation in an automatically-machine-actionable format, e.g., (again) a sequence of one or more operations that automatically can be carried out on the given host-asset 16X, e.g., under the control of its LWS 109. Again, such operations can be invoked by one or more machine-language commands, e.g., one or more Java byte codes. After deployment package D_PAK(i) is created at block 516, flow can proceed to block 518.

At block 518, deployment service 178 can send (or, in other words, push) deployment package D_PAK(i) to the given LWS 109. For example, deployment service 178 can pass deployment package D_PAK(i) to communication service 170. Then communication service 170 can send D_PAK(i) to the given LWS 109 over, e.g., path 132. Flow can proceed from block 518 to block 520.

At block 520 in FIG. 5, deployment service 178 can monitor the implementation upon the given host-asset 16X of the remediation represented by deployment package D_PAK(i). Such monitoring can be carried out via communication facilitated by communication service 170.

More particularly, interaction between deployment service 178 and the given LWS 109 (via communication service 170) can obtain more information than merely whether deployment package D_PAK(i) was installed successfully by the given LWS 109 upon its host-asset 16X. Recalling that a remediation represents one or more operations in an automatically-machine-actionable format, it is noted that a remediation will typically include two or more such operations. LWS 109 can provide deployment service 178 with feedback regarding, e.g., the success or failure of each such operation.

From block 520, flow proceeds to block 522, where the flow ends.

It is noted that a bracket 548 is depicted in FIG. 5 that groups together blocks 500-522. And bracket 548 points a block diagram of a typical computer (also referred to as a PC) 550. Typical hardware components for computer 550 include a CPU/controller, an I/O unit, volatile memory such as RAM and non-volatile memory media such disk drives and/or tape drives, ROM, flash memory, etc. Bracket 548 and computer 550 are depicted in FIG. 5 to illustrate that blocks 500-522 can be carried out by computer 550, where computer 550 can correspond, e.g., to server 102, etc.

The methodologies discussed above can be embodied on a machine-readable medium. Such a machine-readable medium can include code segments embodied thereon that, when read by a machine, cause the machine to perform the methodologies described above.

Of course, although several variances and example embodiments of the present invention are discussed herein, it is readily understood by those of ordinary skill in the art that various additional modifications may also be made to the present invention. Accordingly, the example embodiments discussed herein are not limiting of the present invention.

What is claimed is:

1. A method comprising:
    collecting, by a light weigh sensor (LWS) running on a host asset of a plurality of monitored host assets within an enterprise network, information regarding a program-code-based operational state of the host asset via a survey tool installed on the host asset;
    transmitting, by the LWS, the information to a remote server that is in a client-server relationship with the LWS via an external network coupling the enterprise network and the remote server in communication; and
    enforcing, by the remote server, a plurality of security policies with respect to the host asset based on the received information including determining whether the program-code-based operational state of the host asset represents a violation of one or more security policies of the plurality of security policies, by evaluating, the received information with respect to the plurality of security policies, wherein each security policy of the plurality of security policies define at least one parameter condition violation of which is potentially indicative of unauthorized activity on the host asset or manipulation of the host asset making the host asset vulnerable to attack.

2. The method of claim 1, wherein the host asset comprises a network-attached storage (NAS) device, a router, a switch, a personal computer or a printer.

3. The method of claim 2, further comprising when a result of the determining is affirmative, then causing, by the remote server, the host asset to perform one or more remediation actions.

4. The method of claim 2, further comprising when a result of the determining is affirmative, then causing, by the remote server, one or more selected remediations to be deployed to the host asset based on the violation.

5. The method of claim 2, further comprising when a result of the determining is affirmative, then causing, by the remote server, one or more actions or operations to be carried out on the host asset.

6. The method of claim 5, wherein the one or more actions or operations at least in part implement a precautionary measure to improve reliability, availability or survivability of the host asset.

7. The method of claim 5, wherein the one or more actions or operations are suited to remediating circumstances of the violation.

8. The method of claim 3, further comprising maintaining, by the remote server, a policy database having stored therein the plurality of security policies.

9. The method of claim 8, further comprising maintaining, by the remote server, a remediation database having stored therein information regarding a plurality of remediation actions including the one or more remediation actions.

10. The method of claim 2, wherein the violation relates to existence or non-existence of a particular application on the host asset.

11. The method of claim 2, wherein the violation is based at least in part on a version of a particular application on the host asset.

12. The method of claim 2, wherein the violation is based at least in part on whether a patch associated with a particular application has been installed on the host asset.

13. The method of claim 2, wherein the violation is based at least in part on a version of an operating system or a type of the operating system running on the host asset.

14. The method of claim 2, wherein the violation relates to whether a particular process is running on the host asset.

15. The method of claim 4, further comprising prior to said causing, by the remote server, the remediation to be deployed to the host asset, determining whether the remediation has been configured for automatic deployment.

16. The method of claim 2, wherein the violation relates to one or more of:
   presence of an unknown application or a rogue application on the host asset;
   an operating system test relating to an operating system being run by the host asset;
   whether a removable storage device is connected to the host asset;
   a particular process is running on the host asset; and
   a state associated with one or more ports of the host asset.

17. The method of claim 2, wherein the violation relates to one or more of:
   existence or non-existence of a particular file on the host asset;
   a location of a particular file on the host asset; and
   one or more permissions associated with the particular file.

18. The method of claim 2, wherein the information regarding the program-code-based operational state comprises information indicative of one or more drivers installed on the host asset.

19. The method of claim 18, wherein the violation relates to existence or non-existence of a particular type of driver on the host asset.

20. The method of claim 19, wherein the particular type of driver comprises a universal serial bus (USB) driver.

\* \* \* \* \*